United States Patent
Evans et al.

(10) Patent No.: US 10,809,546 B2
(45) Date of Patent: Oct. 20, 2020

(54) DIGITAL LIGHT PATH LENGTH MODULATION

(71) Applicant: Avegant Corp., Belmont, CA (US)

(72) Inventors: Allan Thomas Evans, San Francisco, CA (US); Andrew John Gross, Redwood City, CA (US); D. Scott Dewald, Dallas, TX (US)

(73) Assignee: Avegant Corp., San Mateo, CA (US)

( * ) Notice: Subject to any disclaimer, the term of this patent is extended or adjusted under 35 U.S.C. 154(b) by 112 days.

(21) Appl. No.: 15/236,101

(22) Filed: Aug. 12, 2016

(65) Prior Publication Data

US 2018/0045984 A1    Feb. 15, 2018

(51) Int. Cl.
| | | |
|---|---|---|
| *G02B 26/08* | (2006.01) | |
| *G02F 1/29* | (2006.01) | |
| *G02F 1/01* | (2006.01) | |
| *G02B 27/28* | (2006.01) | |

(52) U.S. Cl.
CPC ......... *G02F 1/0136* (2013.01); *G02B 27/283* (2013.01); *G02B 2207/117* (2013.01)

(58) Field of Classification Search
CPC .... G03B 35/18; G03B 35/26; G03B 21/2073; H04N 9/3105; H04N 9/315; G02F 1/01; G02F 1/13363; G02C 7/101; G02C 7/12; G02B 27/017; G02B 26/001; G02B 26/0841; G02B 26/02; G09G 3/3466; G09G 3/2074
USPC .................................................. 359/298–304
See application file for complete search history.

(56) References Cited

U.S. PATENT DOCUMENTS

| | | |
|---|---|---|
| 3,586,416 A | 6/1971 | Bitetto |
| 3,856,407 A | 12/1974 | Takeda et al. |
| 4,253,723 A | 3/1981 | Kojima et al. |
| 4,670,744 A | 6/1987 | Buzak |
| 5,610,765 A | 3/1997 | Colucci |
| 5,751,243 A | 5/1998 | Turpin |
| 6,134,031 A | 10/2000 | Nishi et al. |
| 6,515,801 B1 | 2/2003 | Shimizu |

(Continued)

FOREIGN PATENT DOCUMENTS

| | | |
|---|---|---|
| CN | 102566049 A | 7/2012 |
| CN | 105739093 A | 7/2016 |

(Continued)

OTHER PUBLICATIONS

Hu, Xinda et al., "High-resolution optical see-through multi-focal-plane head-mounted display using freeform optics," Opt. Express 22, 13896-13903 (2014).

(Continued)

*Primary Examiner* — William R Alexander
*Assistant Examiner* — Tamara Y. Washington
(74) *Attorney, Agent, or Firm* — HIPLegal LLP; Judith Szepesi

(57) ABSTRACT

A system to adjust light path length utilizing a digital light path length modulator. The digital light path length modulator includes an optical path length extender (OPLE) with a plurality of polarization sensitive reflective elements and a polarization modulator. The OPLE has two light paths having different path lengths, so a light having a first polarization is directed through a first light path, and the light having a second polarization is directed through a second light path.

22 Claims, 23 Drawing Sheets

(56) References Cited

U.S. PATENT DOCUMENTS

| | | |
|---|---|---|
| 6,580,078 B1 | 6/2003 | O'callaghan et al. |
| 7,023,548 B2 | 4/2006 | Pallingen |
| 7,360,899 B2 | 4/2008 | Mcguire, Jr. et al. |
| 7,798,648 B2 | 9/2010 | Ijzerman et al. |
| 7,905,600 B2 | 3/2011 | Facius et al. |
| 8,262,234 B2 | 9/2012 | Watanabe |
| 8,755,113 B2 | 6/2014 | Gardner et al. |
| 9,025,067 B2 | 5/2015 | Gray et al. |
| 9,304,319 B2 | 4/2016 | Bar-Zeev et al. |
| 9,494,805 B2 | 11/2016 | Ward et al. |
| 9,588,270 B2 | 3/2017 | Merrill et al. |
| 10,057,488 B2 | 8/2018 | Evans et al. |
| 10,185,153 B2 | 1/2019 | Eash et al. |
| 10,187,634 B2 | 1/2019 | Eash et al. |
| 2001/0027125 A1 | 10/2001 | Kiyomatsu et al. |
| 2002/0191300 A1 | 12/2002 | Neil |
| 2003/0020925 A1 | 1/2003 | Patel et al. |
| 2004/0156134 A1 | 8/2004 | Furuki et al. |
| 2004/0263806 A1 | 12/2004 | Silverstein et al. |
| 2005/0141076 A1 | 6/2005 | Bausenwein et al. |
| 2006/0119951 A1 | 6/2006 | McGuire |
| 2007/0030456 A1 | 2/2007 | Duncan et al. |
| 2007/0030543 A1 | 2/2007 | Javidi et al. |
| 2007/0139760 A1 | 6/2007 | Baker et al. |
| 2007/0146638 A1 | 6/2007 | Ma et al. |
| 2008/0130887 A1 | 6/2008 | Harvey et al. |
| 2008/0174741 A1 | 7/2008 | Yanagisawa et al. |
| 2008/0205244 A1 | 8/2008 | Kitabayashi |
| 2009/0021824 A1 | 1/2009 | Ijzerman et al. |
| 2009/0046262 A1 | 2/2009 | Okazaki et al. |
| 2009/0052838 A1 | 2/2009 | McDowall et al. |
| 2009/0061505 A1 | 3/2009 | Hong et al. |
| 2009/0061526 A1 | 3/2009 | Hong et al. |
| 2009/0237785 A1 | 9/2009 | Bloom |
| 2009/0244355 A1 | 10/2009 | Horie |
| 2011/0032436 A1 | 2/2011 | Shimizu et al. |
| 2011/0075257 A1 | 3/2011 | Hua et al. |
| 2011/0149245 A1 | 6/2011 | Barth et al. |
| 2012/0075588 A1 | 3/2012 | Suga |
| 2012/0113092 A1 | 5/2012 | Bar-Zeev et al. |
| 2013/0070338 A1 | 3/2013 | Gupta et al. |
| 2013/0100376 A1 | 4/2013 | Sawado |
| 2013/0222770 A1 | 8/2013 | Tomiyama |
| 2013/0344445 A1 | 12/2013 | Clube et al. |
| 2014/0168035 A1 | 6/2014 | Luebke et al. |
| 2014/0176818 A1* | 6/2014 | Watson ............... G02B 27/283 349/9 |
| 2015/0061976 A1 | 3/2015 | Ferri |
| 2015/0153572 A1 | 6/2015 | Miao et al. |
| 2015/0205126 A1 | 7/2015 | Schowengerdt |
| 2015/0319342 A1 | 11/2015 | Schowengerdt |
| 2016/0041390 A1 | 2/2016 | Poon et al. |
| 2016/0041401 A1 | 2/2016 | Suga |
| 2016/0077338 A1 | 3/2016 | Robbins et al. |
| 2016/0131920 A1 | 5/2016 | Cook |
| 2016/0195718 A1 | 7/2016 | Evans |
| 2016/0225337 A1 | 8/2016 | Ek et al. |
| 2016/0227195 A1 | 8/2016 | Venkataraman et al. |
| 2016/0306168 A1 | 10/2016 | Singh et al. |
| 2016/0381352 A1* | 12/2016 | Palmer ............... H04N 13/363 353/8 |
| 2017/0038579 A1 | 2/2017 | Yeoh et al. |
| 2017/0068103 A1 | 3/2017 | Huang et al. |
| 2017/0075126 A1 | 3/2017 | Carls et al. |
| 2017/0097507 A1 | 4/2017 | Yeoh et al. |
| 2017/0146803 A1 | 5/2017 | Kishigami et al. |
| 2017/0160518 A1 | 6/2017 | Lanman et al. |
| 2017/0227770 A1 | 8/2017 | Carollo et al. |
| 2017/0269369 A1 | 9/2017 | Qin |
| 2018/0045973 A1 | 2/2018 | Evans et al. |
| 2018/0045974 A1 | 2/2018 | Eash et al. |
| 2018/0045984 A1 | 2/2018 | Evans et al. |
| 2018/0048814 A1 | 2/2018 | Evans et al. |
| 2018/0149862 A1 | 5/2018 | Kessler et al. |
| 2018/0283969 A1 | 10/2018 | Wang et al. |
| 2019/0007610 A1 | 1/2019 | Evans et al. |
| 2019/0086675 A1* | 3/2019 | Carollo ............. G02B 27/0172 |
| 2019/0155045 A1 | 5/2019 | Eash et al. |
| 2019/0174124 A1 | 6/2019 | Eash et al. |

FOREIGN PATENT DOCUMENTS

| | | |
|---|---|---|
| CN | 109997357 A | 7/2019 |
| EP | 0195584 A2 | 9/1986 |
| JP | H06258673 A | 9/1994 |
| JP | 3384149 B2 | 3/2003 |
| WO | 2012104839 A1 | 8/2012 |
| WO | 2012175939 A1 | 12/2012 |
| WO | 2015190157 A1 | 12/2015 |
| WO | 2016087393 A1 | 6/2016 |

OTHER PUBLICATIONS

Lee, Yun-Han et al., Switchable Lens for 3D Display, Augmented Reality and Virtual Reality. Society for Information Display (SID), International Symposium Digest of Technical Papers, vol. 47, Issue 1, May 25, 2016 (4 page).

Pate, Michael, Polarization Conversion Systems for Digital Projectors, Web Publication, Apr. 21, 2006, Downloaded from http://www.zemax.com/os/resources/learn/knowledgebase/polarization-conversion-systems-for-digital-projectors on Jun. 17, 2016 (8 pages).

PCT Written Opinion PCT/US2017/046648, dated Nov. 17, 20017, 14 pages.

PCT Search Report PCT/US2017/046648, dated Nov. 17, 20017, 3 pages.

Polatechno Co., Ltd., LCD Projector Components, http://www.polatechno.co.jp/english/products/projector.html downloaded Jun. 17, 2016 (2 pages).

Matjasec et al., "All-Optical Thermos-Optical Path Length Modulation based on the Vanadium-Doped Fibers," Optical Society of America, vol. 21, No. 10, May 2013, pp. 1-14.

Sandner et al., "Translatory MEMS Actuators for optical path length modulation in miniaturized Fourier-Transform infrared spectrometers," MEMS MOEMS 7(2), Apr.-Jun. 2008 pp. 1-11.

Extended European Search Report, EP 17840391.1, dated Feb. 25, 2020, 9 pages.

\* cited by examiner

Intermediate Polarization modulator off.
Incoming light in State 2 is has no path extension.
Incoming light in State 1 is extended by d1+d2

Intermediate Polarization modulator on.
Incoming light in State 2 is extended by d1.
Incoming light in State 1 is extended by d2

DIGITAL LIGHT PATH LENGTH MODULATION

FIELD

The present invention relates to optics, and more particularly to extending light paths.

BACKGROUND

Providing multiple focal planes, or discrete steps of focus adjustment, is useful for a number of applications. It can be part of creating a more realistic three dimensional display, as well as the ability to capture three dimensional data. In the prior art, multiple focus capture utilized mechanical movement such as gears or liquid lenses. Such mechanisms are expensive, slow, and relatively fragile. Another prior art method of capturing multiple focal lengths uses multiple mirrors and lenses. This is like having multiple cameras; it is bulky and expensive. Because of the bulk and expense, it also limits the number of focal lengths that can be simultaneously captured. A large beam splitter has also been used in the prior art to create two light path lengths. However, this is also a bulky solution.

Such prior art solutions are some combination of large, expensive, and slow. Liquid lenses are expensive and slow, and large beam splitters are large. This makes them difficult to use, and not useful for size or cost constrained systems, particularly portable or worn devices.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

A digital light path length modulator is described. The digital light path length modulator includes an optical path length extender (OPLE) and a polarization modulator, and can be used to adjust the path length of light. In one embodiment, light with state 1 polarization travels through a longer path in the OPLE than light with state 2 polarization. This can be used to create two focal planes. An OPLE is made up of one or more plates with a plurality of polarization sensitive reflective elements. A plurality of digital light path length modulators create a modulation stack.

In one embodiment, using a modulation stack the number of focal planes can be increased. This provides the capacity to build a system that can meet the physiological requirements of human vision, by creating display in which the 3D indicia of overlap, focus, and vergence match. This produces a better quality 3D display and can prevent the headaches associated with 3D displays.

This mechanism in one embodiment can also be used for image capture, and various other uses in which light waves or other waves in a similar spectrum are either projected or captured, including but not limited to cameras, binoculars, 3D printing, lithography, medical imaging, etc. Creating a simple, easy to manufacture digital light path length modulator is like the step from vacuum tubes to transistors, it enables more complex, cheaper, and much more dense digitally controlled elements, which can become building blocks for a wide range of uses.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1A:
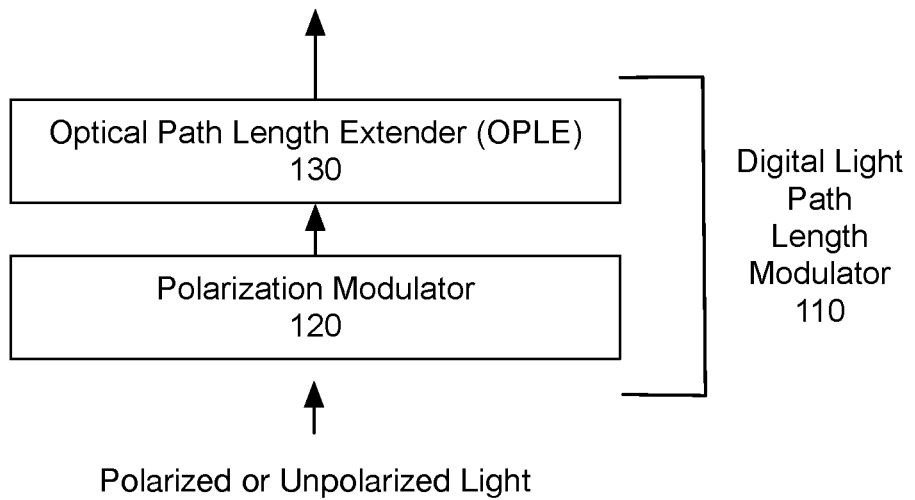
FIG. 1A is a block diagram of one embodiment of a digital light path length modulator.

FIG. 1A is a block diagram of one embodiment of the digital light path length modulator. The digital light path length modulator 110, includes an optical path length extender (OPLE) 130 and a polarization modulator 120. The polarized or unpolarized light impacts the polarization modulator 120. The polarization modulator 120 may rotate polarization, leave the polarization unchanged, and/or filter the light. The output of the polarization modulator 120 enters the OPLE 130. In one embodiment, the polarization modulator 120 is digital, thus providing a digital control to select light path length by turning on and off the polarization modulator 120. In one embodiment, the switching speed of the polarization modulator 120 is adjustable, and switching speed may be under 50 milliseconds. The combination of the polarization modulator 120 and OPLE 130 enables the digital light path length modulator 110 to selectively lengthen the light path.

Figure 1B:
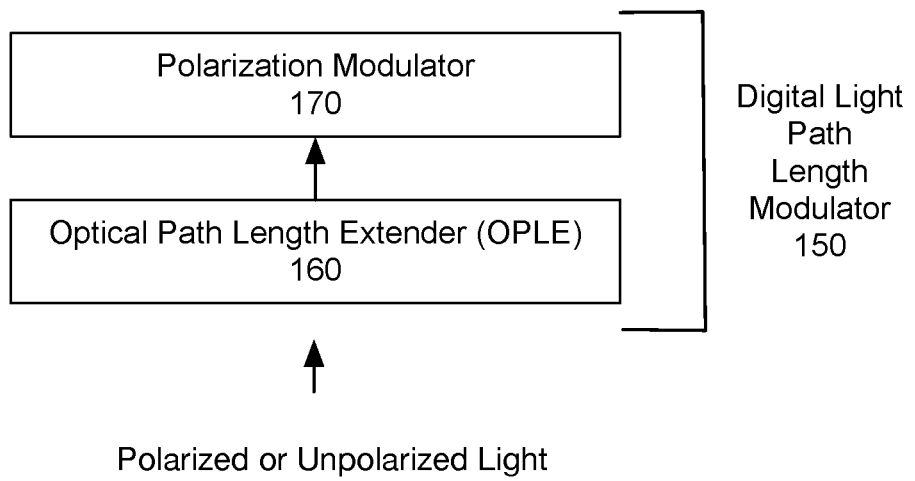
FIG. 1B is a block diagram of one embodiment of a digital light path length modulator.

FIG. 1B is a block diagram of one embodiment of the digital light path length modulator. The digital light path length modulator 150 includes an OPLE 160 and a polarization modulator 170. In this instance, the polarization modulator 170 is placed after the OPLE 160. The polarization modulator 170 can act as a filter, to remove a portion of the light. Either configuration of the digital light path length modulator, shown in FIG. 1A or 1B may be utilized. In one embodiment, a digital light path length modulator may include a polarization modulator on both sides of the OPLE.

The OPLE may comprise one or more plates with a plurality of polarization sensitive reflective elements. The OPLE does not need to be flat, and may in one embodiment be curved to provide additional optical features. The polarization sensitive reflective elements in the OPLE are substantially parallel in one embodiment. In another embodiment, they may not be parallel, but may be angled to provide other optical characteristics. The polarization sensitive reflective elements in the OPLE may be evenly spaced in one embodiment. In another embodiment, the spacing of the polarization sensitive reflective elements may vary along the length of the OPLE.

Figure 2A:
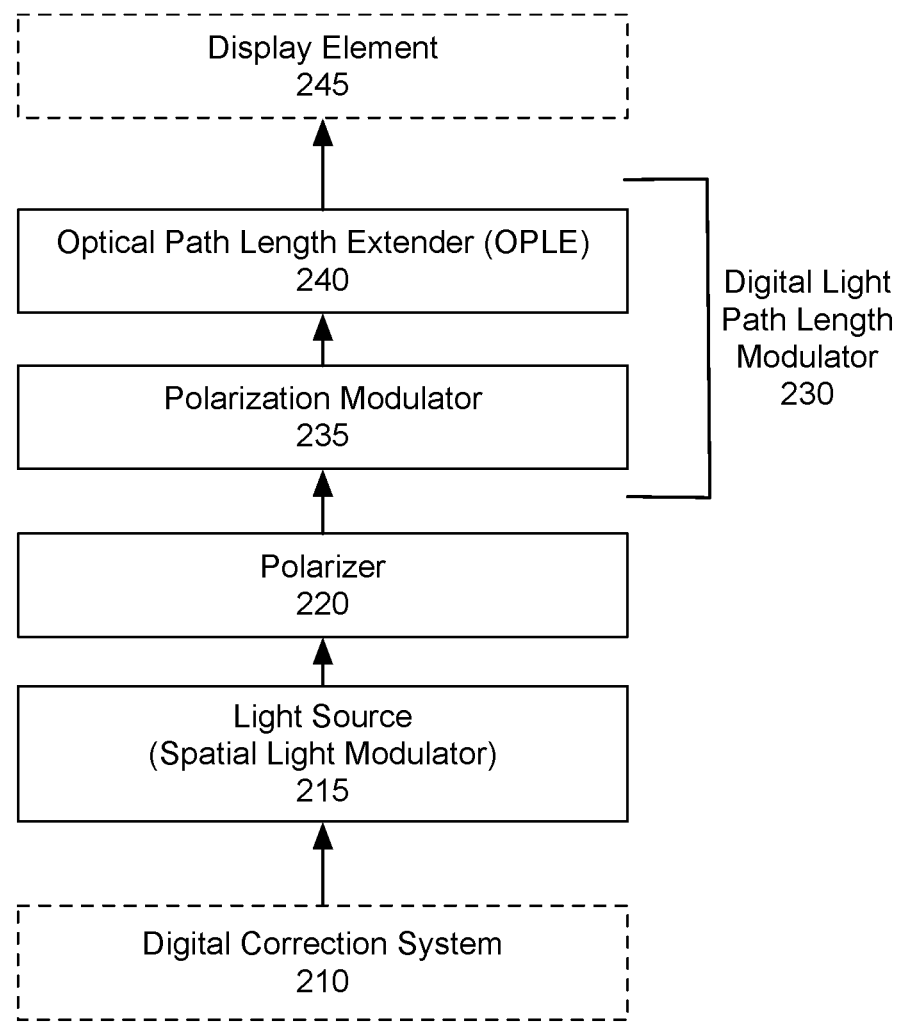
FIG. 2A is a block diagram of one embodiment of a system in which the digital light path length modulator may be used.

FIG. 2A is a block diagram of one embodiment of a system in which the digital light path length modulator may be used. The system is for display. The light source 215 provides the light for display. The light source 215 may be a spatial light modulator.

In one embodiment, there may be a digital correction system 210, which adjusts the output of the light source to compensate for the predicted difference in the location of light of different polarizations coming out of the digital light path length modulator 230. By pre-adjusting the light, the resulting light regardless of its path length is properly positioned when it is displayed.

The digital correction system 210 spatially shifts the image elements entering the digital light path length modulator 230 which would be shifted by the digital light path length modulator 230, to place them in the correct location upon exit from the digital light path length modulator 230. The spatial shifting may include lateral shift correction, and correction for other artifacts of the system. Such pre-calculation of the output of a digital display system is known in the art. Digital correction systems 210 are utilized to correct for lens warping, color separation, and other issues. The digital correction system 210 creates an output which is in the "rendering state" such that the perceived image by the user is correct.

In one embodiment, the optical path length extender (OPLE) 240 may be configured to be self-aligned. That is, spatial shift between the light that travels the longer and the shorter path through the OPLE 240 may be eliminated, or may be set to an intentional spatial shift. The creation of such a self-aligned OPLE is discussed below.

In the embodiment of FIG. 2A, the light from light source 215 is polarized by polarizer 220. The polarizer 220 may be eliminated if the light source 215 outputs polarized light, or may be integrated into the light source 215. The output of the polarizer 220 is light with one polarization.

The digital light path length modulator 230 includes a polarization modulator 235 and an OPLE 240. The polarization modulator 235, in one embodiment, is an electronically controlled element which can rotate the polarization of beams of light between two orthogonal states, state 1 and state 2, by selectively modulating the polarization of some or all of the light. In one embodiment, the orthogonal states are S-polarized and P-polarized light. The polarization modulator 235 may also be a filter which selectively filters light.

In one embodiment, the polarization modulator 235 is an electronically controlled liquid crystal device (LCD). In another embodiment, the polarization modulator may be a Faraday modulator, a switchable birefringent crystal (i.e. LiNO3), or another modulator, which can selectively modulate a portion or all of the light impacting it. In one embodiment, the polarization modulator 235 may selectively polarize the light based on other factors, such as color, wavelength, etc.

The polarization modulator 235 may modulate a subset of the light that impacts it, in one embodiment. In another embodiment, the polarization modulator 235 may modulate all of the light, and switch modulation in time sequential slices. Time sequential slices means that light impacting at time T is not modulated, while light impacting at time T+x is modulated. Because the image perceived by a human user is constructed of a series of time sequential slices of data, in one embodiment, these slices are perceived as components of a single image. This is referred to as "biological real time," which is perceived as being concurrent by a human viewer, even though it is time sequential in processing and display.

The polarized or selectively polarized light impacts the OPLE 240. The OPLE 240 includes one or more plates, each plate having a plurality of polarization sensitive reflective elements, which reflect light having a first polarization, and pass through light with a second polarization. The reflected light bounces between the polarization sensitive reflective elements two or more times, before exiting the OPLE 240. This increases the path length of the light having the first polarization, compared to the light having the second polarization which passes directly through the OPLE 240. In one embodiment, the light exits the OPLE 240 at the same angle that it entered the OPLE 240.

Use of this system, alters the relative light path length of the light with the two polarizations, because the light with a first polarization travels through a longer path than the light with the second polarization.

Utilizing a plurality of digital light path length modulators 230 allows for a multitude of digitally selectable path lengths. Having the various selectable path lengths enables the creation of multiple focal lengths of light exiting the digital light path length modulator 230, since the light appears to be at different distances from the user, based on the length of the light path. In one embodiment, image elements formed by the light that has a longer light path appear further from a user.

In one embodiment, the OPLE 240 is self-aligned so that light exiting the OPLE 240 is not spatially shifted, or intentionally spatially shifted, regardless of polarization.

The specific configuration of the OPLE 240, and its manufacture, is discussed in more detail below.

The OPLE 240 and polarization modulator 235 make up the digital light path length modulator 230. A digital light path length modulator 230 creates two or more light path lengths. Although only a single digital light path length modulator 230 is shown in FIG. 2A, the system may include a modulation stack with a plurality of digital light path length modulators 230, to create an increasing number of light path lengths. This may be used to create more focal planes, to create a perception of a hologram. The system thus provides slices of a hologram at two or more focal planes. As the number of focal planes is increased, the output provides 3D cues that approach the limits of human perception. By utilizing a number of focal planes perceived by a user, the perception or recording of a digital hologram can be created.

The output of the digital light path length modulator 230 is displayed via display element 245, or through some other means. The display element 245 may provide a component for a three-dimensional display, with image elements displayed in different focal planes.

Figure 2B:
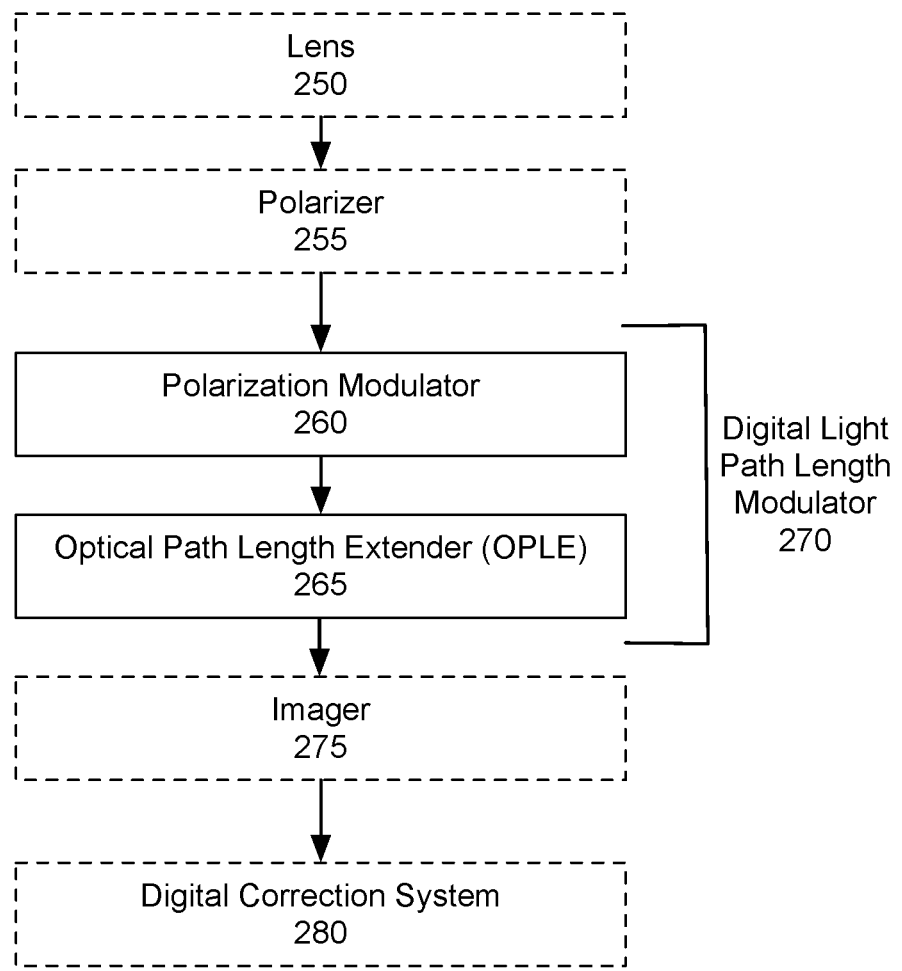
FIG. 2B is a block diagram of another embodiment of a system in which the digital light path length modulator may be used.

FIG. 2B is a block diagram of another embodiment of the system in which the digital light path length modulator may be used. In this embodiment, rather than displaying light/images/data, the system captures light/images/data. In one embodiment, the initial image or data enters a lens 250. Polarizer 255 polarizes the light, if it is not already polarized when it is captured.

The polarized light is then selectively modulated by polarization modulator 260, and passed through OPLE 265. As noted above, within the OPLE 265, the differently polarized light has different path lengths. In one embodiment, a portion of light may be polarized so that a portion of an image embodied in the light goes through a longer light path than another portion. In one embodiment, all of the light may have the same polarization, and the changes in polarization and thus focal length may be varied in time sequential slices. In one embodiment, the system may combine concurrent and time-based light path adjustment.

Imager 275 captures or displays the image. The imager 275 may be an electronic image sensor, such as a charge coupled device (CCD) or a complementary metal oxide semiconductor (CMOS) sensor. The imager 275 may be another capture element, such as film, binoculars, scope, or any mechanism to capture or display an image. In one embodiment, a digital correction system 280 may be used to correct the captured or displayed image to account for any spatial shift between the light beams, because of the path they took. As noted above, in one embodiment, the OPLE 265 is self-aligned.

The OPLE 265 and polarization modulator 260 together form a digital light path length modulator 270. In one embodiment, although only a single digital light path length modulator 270 is shown, the system may include a modulation stack with a plurality of digital light path length modulators 270.

Figure 3A:
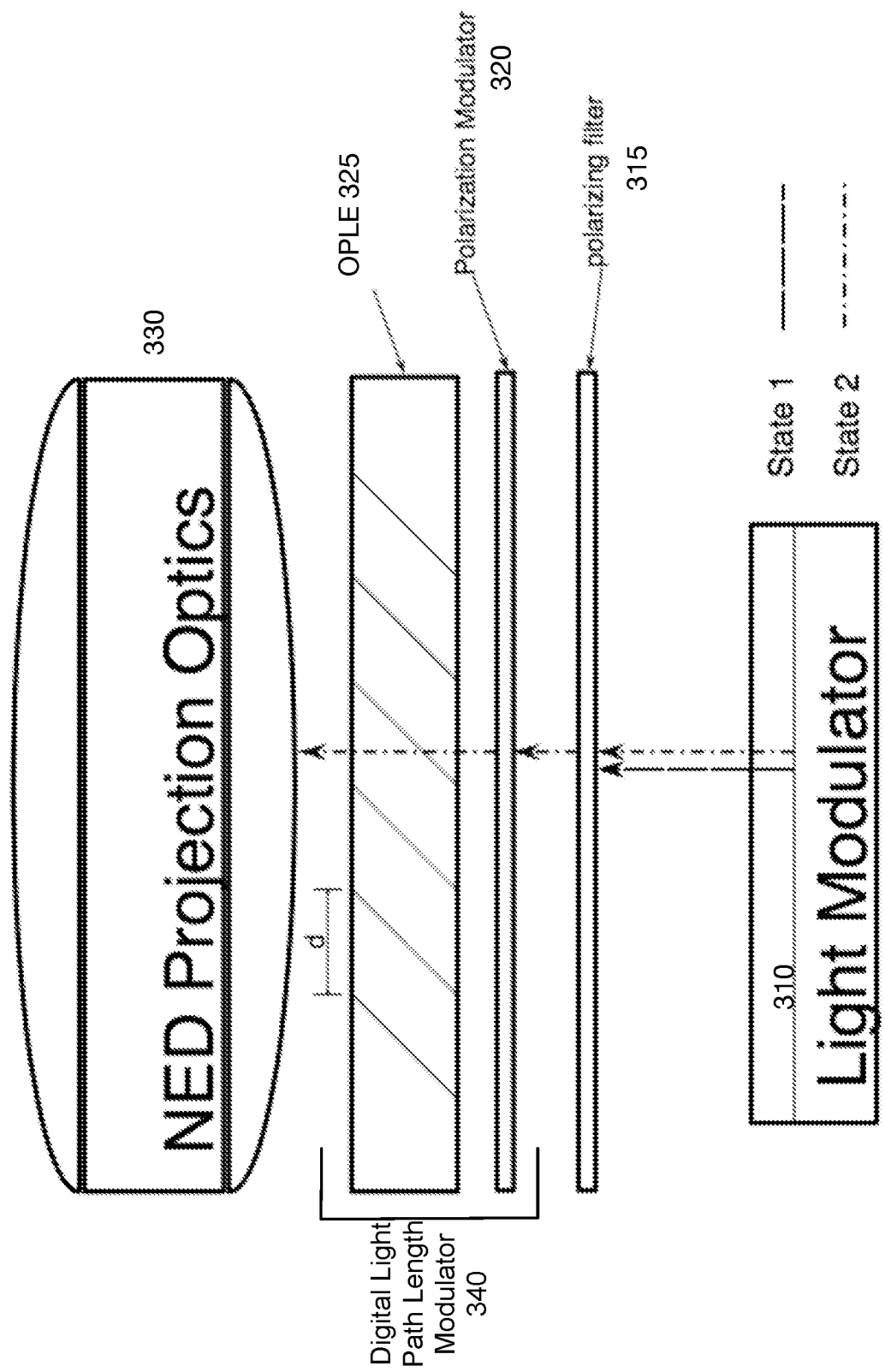
FIGS. 3A and 3B are diagrams of one embodiment of a digital light path length modulator in a near eye display (NED) system.
Figure 3B:
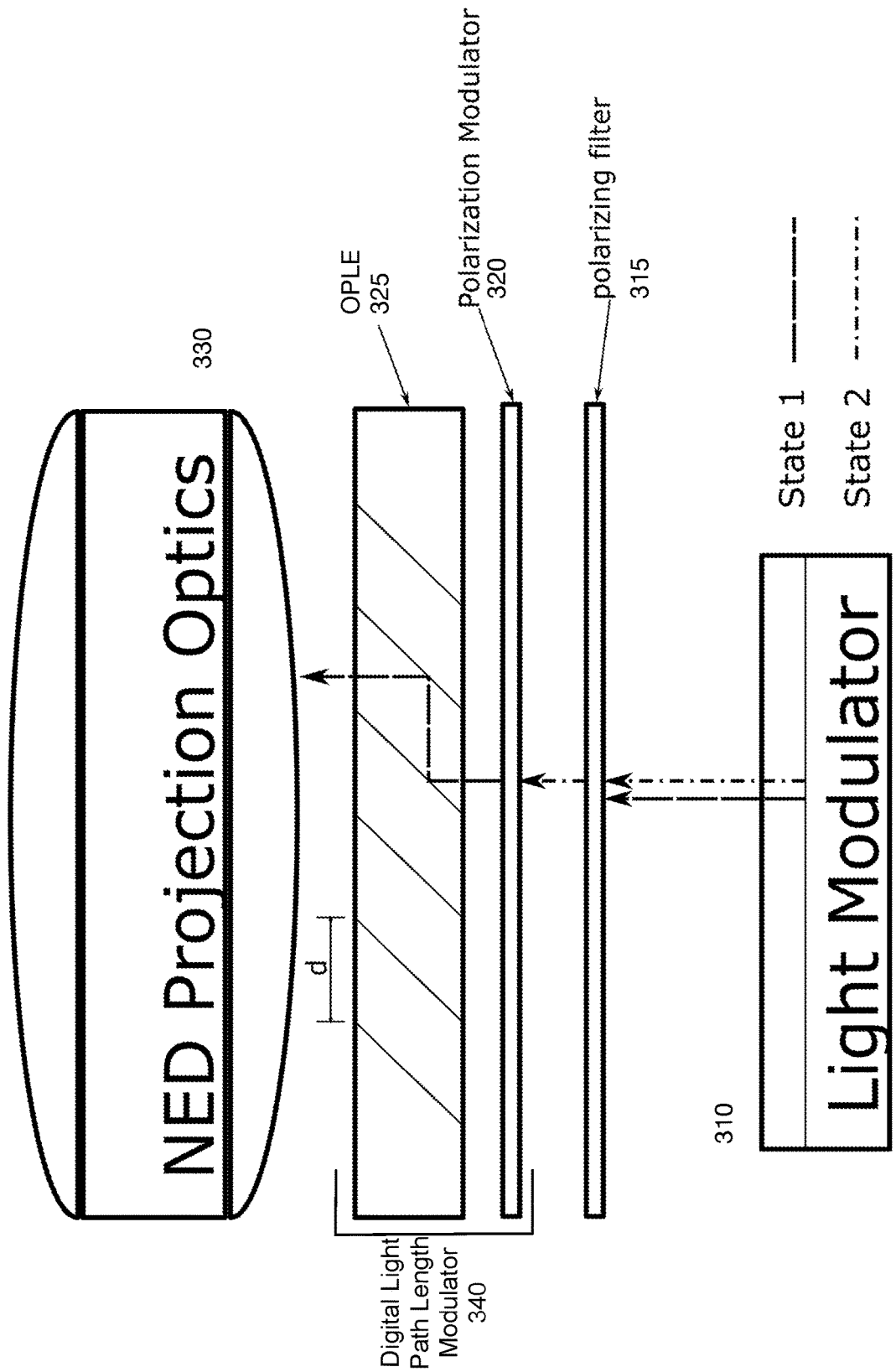

FIGS. 3A and 3B are diagrams of one embodiment of a digital light path length modulator in a near eye display (NED) system. The light modulator 310 outputs polarized light, both state 1 and state 2 polarized light, in one embodiment. Polarizing filter 315 removes the state 1 polarized light, and passes through state 2 polarized light only. The polarization modulator 320 in FIG. 3A is "off," leaving the state 2 polarized light to pass through. In this context, the term "on" refers to a setting in which the polarization modulator 320 rotates the polarization of light, while the term "off" refers to the setting in which the polarization modulator 320 does not alter the polarization of light.

OPLE 325 has a plurality of polarization sensitive reflective elements, which reflect state 1 polarized light, while passing through state 2 polarized light. Here, state 2 polarized light is transmitted straight through (having the shorter light path.) The output in one embodiment is transmitted to near eye display (NED) projection optics 330. Of course, though it is not shown, additional optical elements may be included in this system, including lenses, correction systems, etc.

FIG. 3B is a diagram of the digital light path length modulator of FIG. 3A with the polarization modulator "on." Here, again, the polarizing filter passes only state 2 polarized light. However, here, the polarization modulator 320 modulates the light, and outputs state 1 polarized light. The state 1 polarized light is reflected by the polarization sensitive reflective elements in OPLE 325. Thus, this light goes through a longer light path.

A comparison of FIGS. 3A and 3B, shows that the state 1 polarized light has a longer light path than the state 2 polarized light. In this way, a digital light path length modulator 340 can change the light path length. While only a single digital light path length modulator 340 is shown here, a plurality of digital light path length modulators 340 may be stacked to provide a larger number of light path lengths.

FIGS. 3A and 3B show a time sequential embodiment, in which all of the light entering the digital light path length modulator 340 has one polarization, and is either modulated or not modulated by polarization modulator 320. In this example, the system switches between the states shown in FIGS. 3A and 3B, in time. The polarization modulator 320 may selectively modulate the polarization of a subset of the light, in one embodiment. In one embodiment, modulation may be based on location, time, color, wavelength, and optionally other differentiable factors.

Figure 4A:
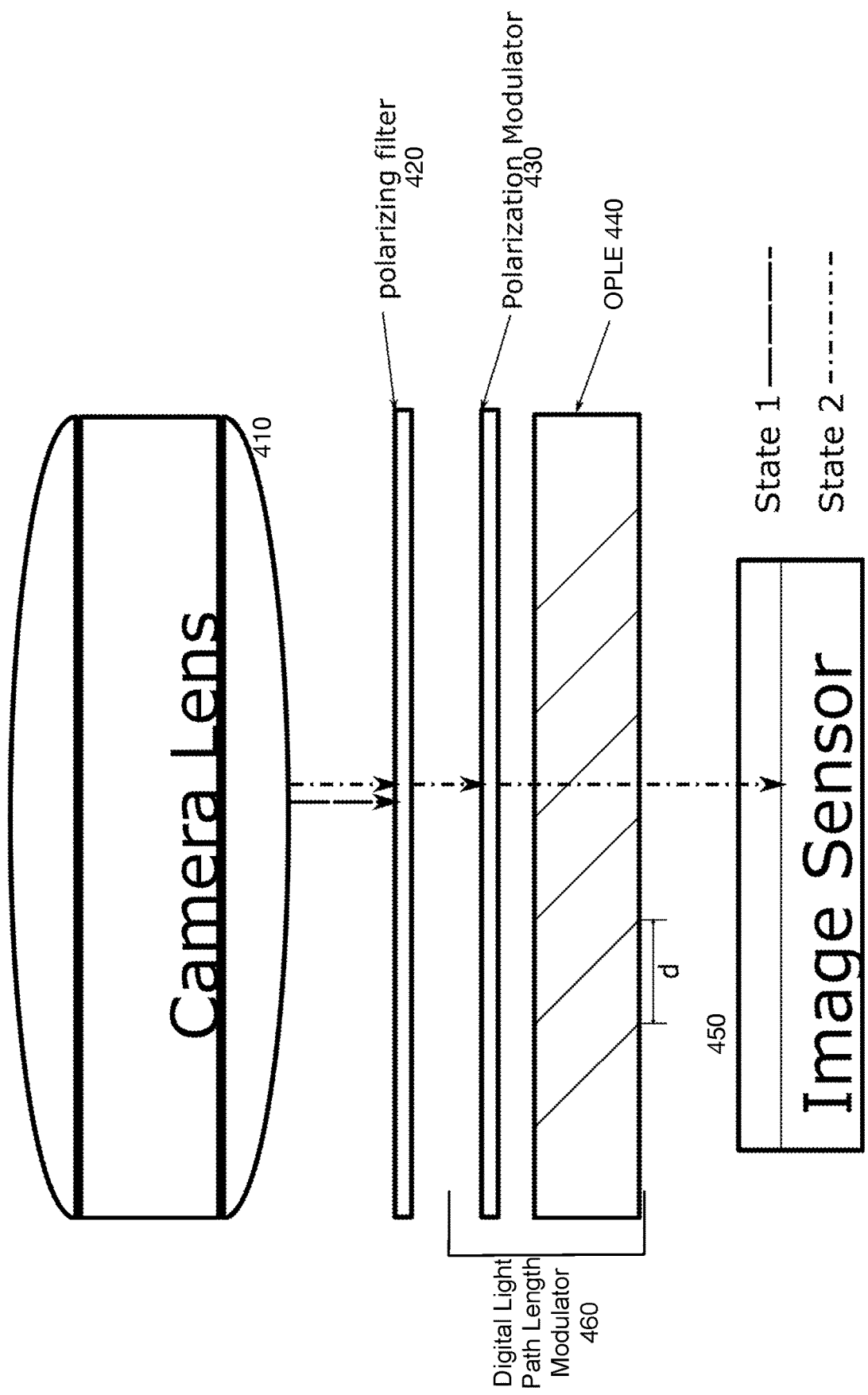
FIGS. 4A and 4B are diagrams of one embodiment of a digital light path length modulator in a camera system.
Figure 4B:
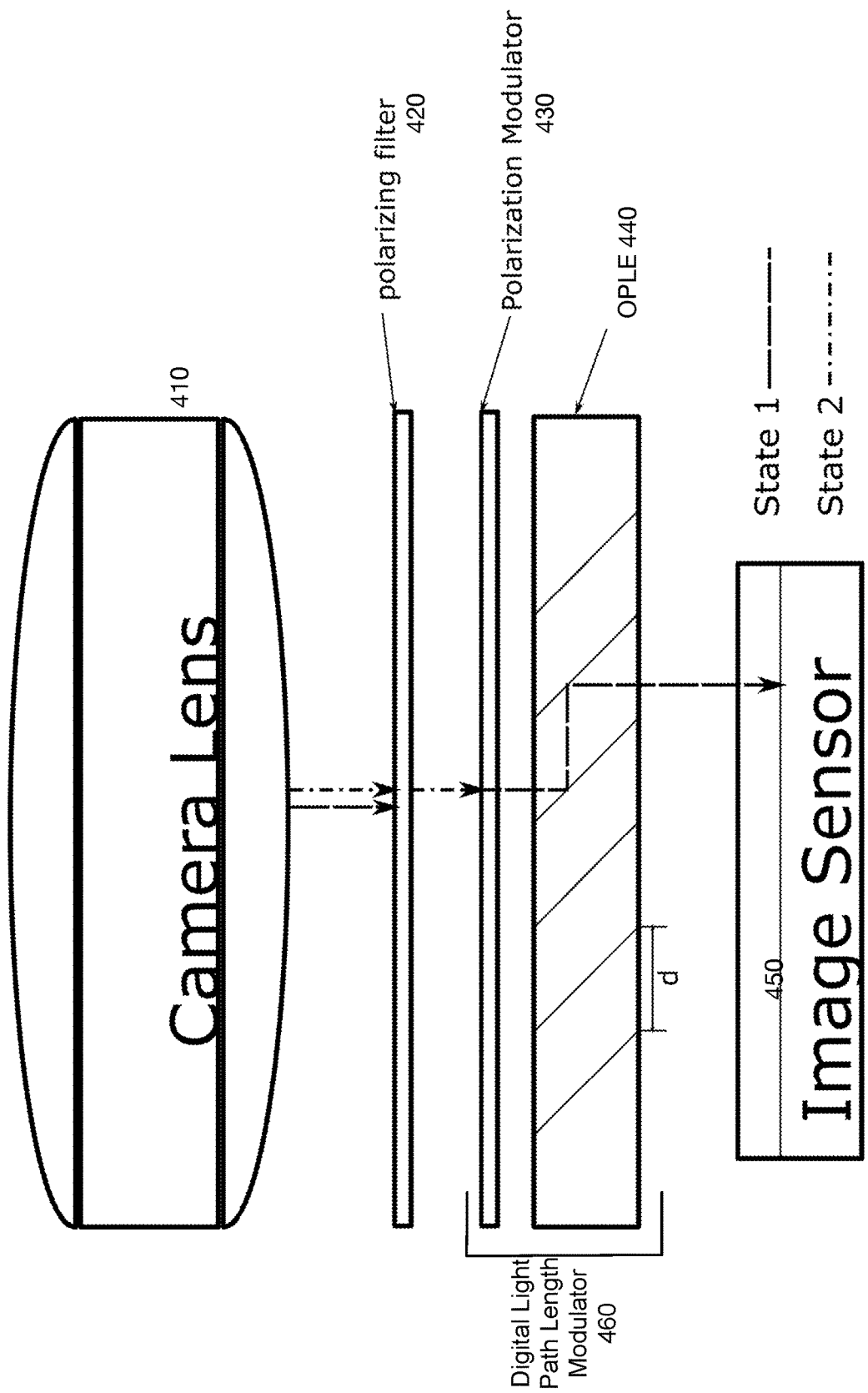

FIGS. 4A and 4B are diagrams of one embodiment of a digital light path length modulator in a camera system. The camera lens 410 captures the image data, and transmits it through the polarizing filter 420. The polarization modulator 430 selectively polarizes the light, and sends it through OPLE 440. The output from OPLE 440 goes to image sensor 450. The polarization modulator 430 is "off" in FIG. 4A, and the state 2 polarized light is not modulated. The OPLE 440 does not reflect state 2 polarized light, and thus the light passes straight through the digital light path length modulator 460. The light coming out digital light path length modulator 460 impacts the image sensor 450. Of course, though it is not shown, additional optical elements may be included in this system, including lenses, correction systems, etc.

FIG. 4B shows the same system when the polarization modulator 430 is on, and modulates the light to state 1 polarization. The state 1 polarized light goes through a longer light path, because it is reflected by the polarization sensitive reflective elements in the OPLE 440. This will cause objects at a nearer distance to come into focus without moving any elements of the imaging lens. Also, focus can be changed as fast as the polarization modulator can change states, which can be under 50 milliseconds. The OPLE 440 and polarization modulator 430 form a digital light path length modulator 460. In one embodiment, the system may include a plurality of digital light path length modulators 460.

Figure 5A:
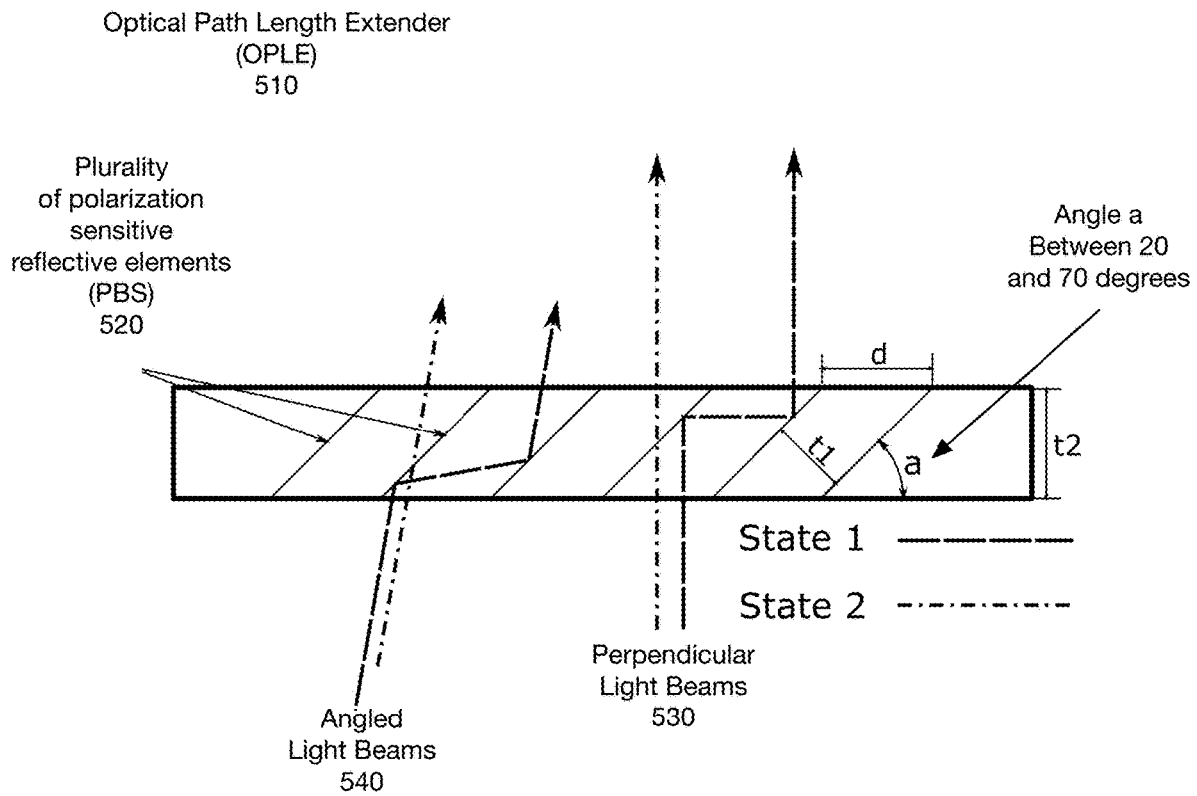
FIG. 5A illustrates one embodiment of a cross-sectional view of an optical path length extender (OPLE).

FIG. 5A illustrates one embodiment of an optical path length extender (OPLE). The OPLE 510 includes a plurality of polarization sensitive reflective elements also referred to as a polarized beam splitters (PBS) 520, which selectively reflect light beams of one polarization state, while passing through light with the other polarization state. The two polarizations are referred to as state 1 and state 2 polarization. The polarization sensitive reflective elements 520 are evenly spaced, parallel to each other, a distance t1 apart from each other, in one embodiment. In another embodiment, the polarization sensitive reflective elements 520 may not be parallel, or evenly spaced.

The thickness of the OPLE 510, t2, in this example, is designed to have the reflected light beam bounce twice before exiting the OPLE 510. Angle "a" defines the angle of the polarization sensitive reflective elements 520 with respect to the face of the OPLE 510 where light enters. The relationship of t1, t2, and angle a define the path length of the light with the polarization state that is reflected. These values also define the position (location and angle) of the reflected polarized light exiting the OPLE 510.

As can be seen, in this example, state 2 polarized light passes straight through the OPLE 510, and state 1 polarized light is reflected through the polarization sensitive reflective element 520, and thus takes a longer light path.

This figure also illustrates that not all of the light impacts the OPLE perpendicular to the face of the OPLE 510. Because light spreads (when it is not collimated light), some of the light impacts as angled light beams 540. FIG. 5A shows that the OPLE 510 provides path lengthening for light impacting at an angle. The change in angle as light enters the OPLE and is refracted is not shown in this figure or similar figures for simplicity.

Figure 5B:
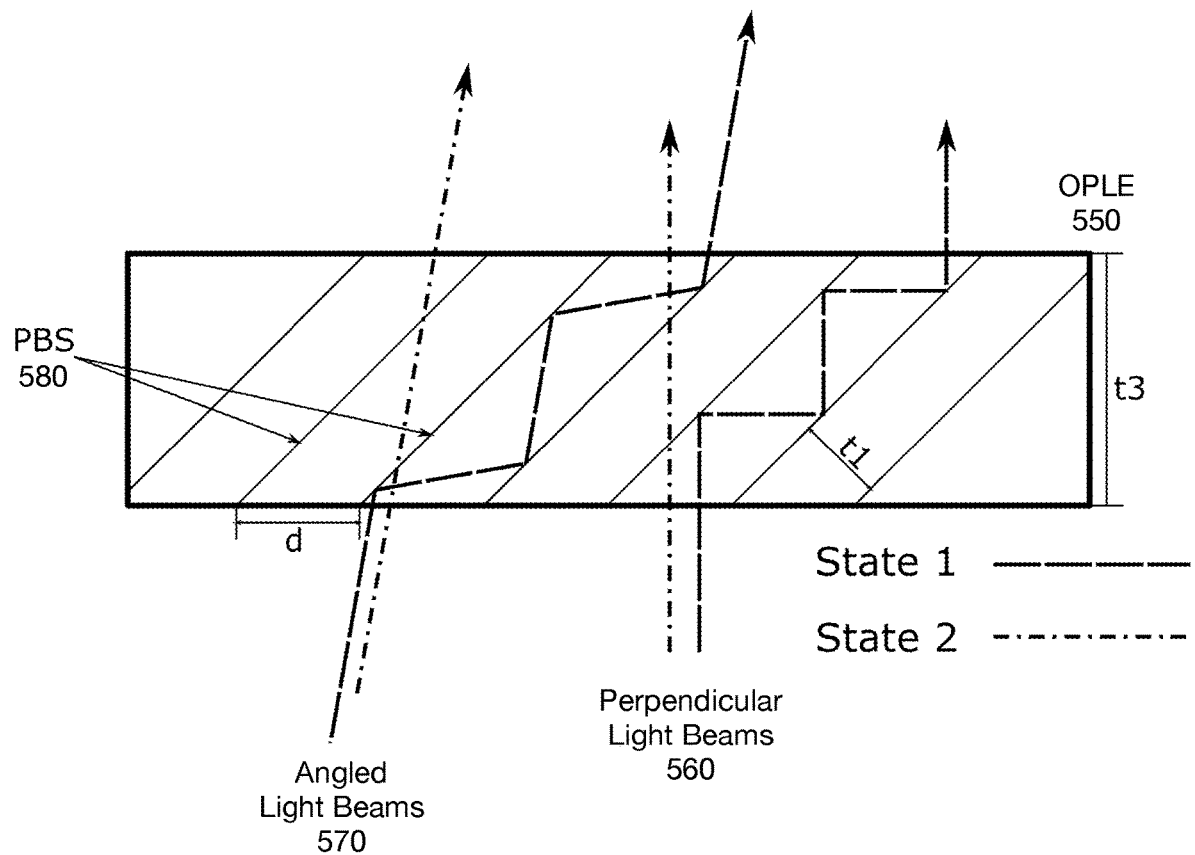
FIG. 5B illustrates another embodiment of an OPLE.

FIG. 5B illustrates another embodiment of an OPLE 550, in which the OPLE 550 is thicker. In this example, the state 1 polarized light bounces multiple times within the OPLE 550. As can be seen from FIGS. 5A and 5B, the thickness of the OPLE impacts how much the light path is lengthened.

Figure 6A:
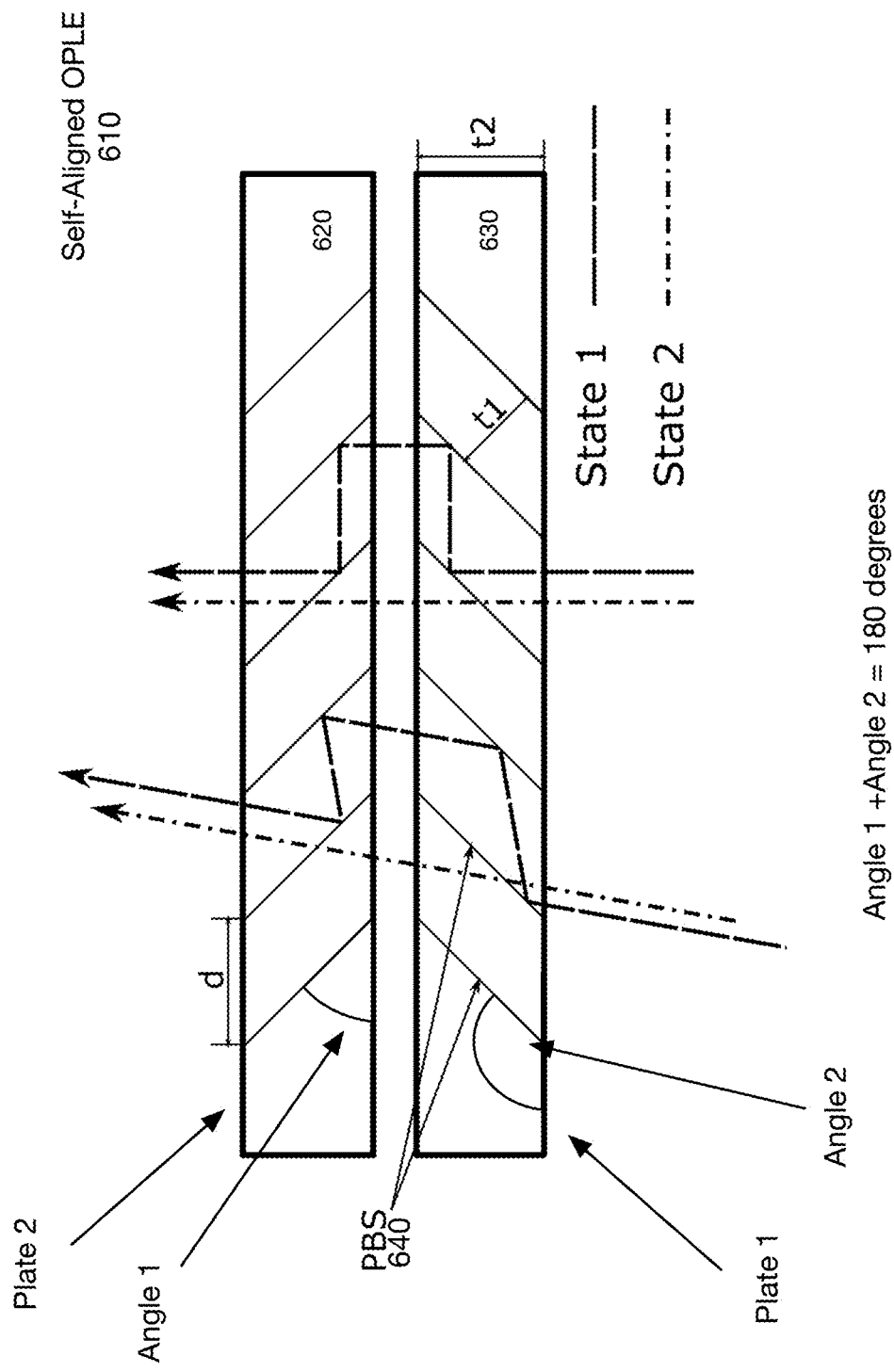
FIG. 6A illustrates one embodiment of a self-aligned OPLE used to control spatial shift.

FIG. 6A illustrates one embodiment of a self-aligned OPLE 610, which includes two plates 620, 630, that adjust the spatial shift of the reflected light. The self-aligned OPLE 610 can be used to spatially realign the reflected and passed-through light. In one embodiment, the two plates 620, 630 are matched. As shown in FIG. 6A, they may be matched by having the same thickness, t2, and mirror image polarization sensitive reflective elements 640. In one embodiment, two plates may be matched by having the spatial shift created by one of the plates 620 with a particular thickness, and angle of the polarization sensitive reflective elements be matched by a second plate 630 with a different thickness and/or angles, which is designed to provide a matching spatial shift.

Using the self-aligned OPLE adjusts the spatial shift between the light going through the shorter and longer light paths. In one embodiment, for a self-aligned OPLE 610 with two plates having mirrored 45 degree angled polarization sensitive reflective elements, the relative positions of the two light beams exiting the OPLE 610 is identical to their relative position entering the OPLE 610. This is useful to eliminate the need for correction of a spatial shift in the input or output. In one embodiment, the self-aligned OPLE 610 may also be used to intentionally set a particular spatial shift. The effective thickness of OPLE 610 is the cumulative thickness of the plates 620, 630 making up the OPLE 610, in this case 2*t2.

As shown in FIG. 6A, there may be a gap between the two plates 620, 630 of OPLE 610. In one embodiment, the size of the gap is irrelevant, since light travels straight through the gap. In one embodiment, other optical elements, including other OPLEs, polarization modulators, etc. may be positioned between the two plates 620, 630. The plates of the self-aligned OPLEs 610 do not require spatial proximity, in one embodiment.

Figure 6B:
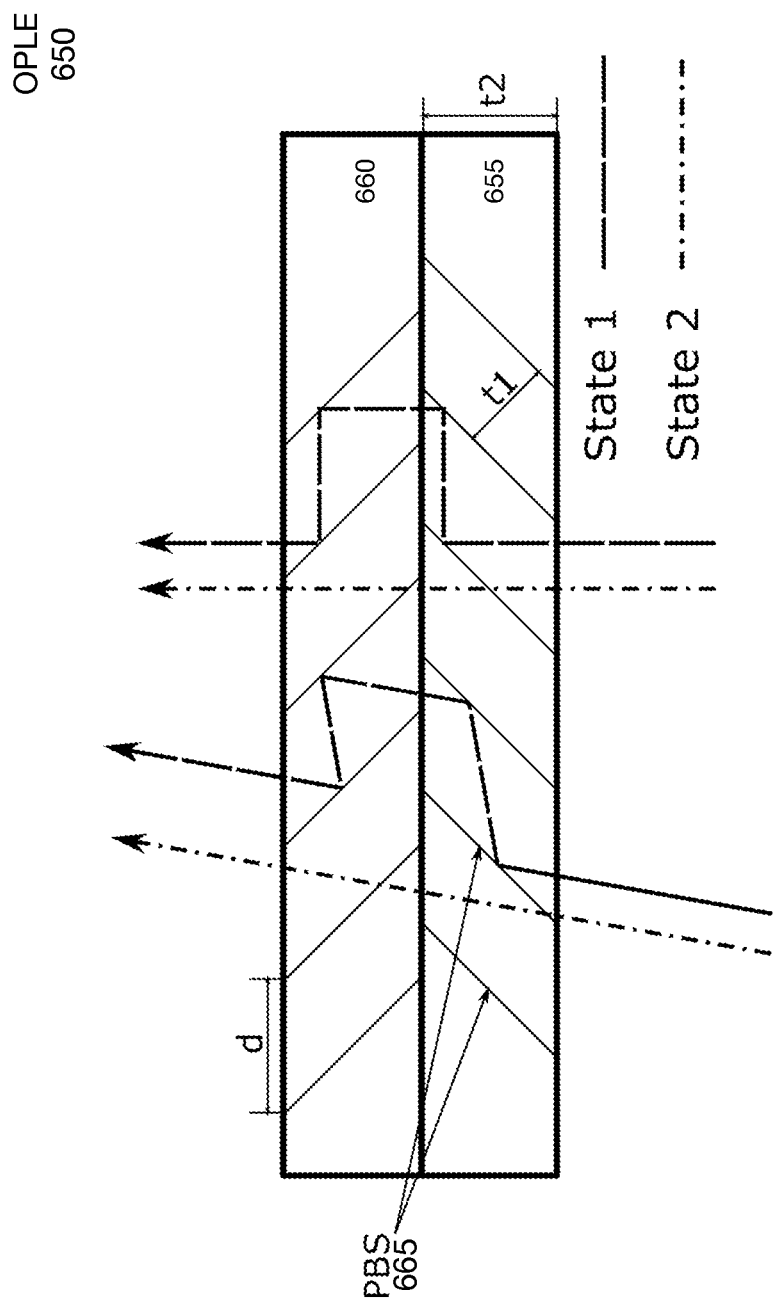
FIG. 6B illustrates another embodiment of a self-aligned OPLE.

FIG. 6B illustrates another embodiment of an OPLEs 650. In this example, there is no gap between the two plates 655, 660 of the OPLE 650. Furthermore, in this configuration, the polarization sensitive reflective elements 665 of the two plates 655, 660 are not aligned. However, they do have the same distance (d) between the polarization sensitive reflective elements. As can be seen, such shifts between the positioning of the parallel polarization sensitive reflective elements 655 do not alter the functioning of the OPLE 650.

Figure 6C:
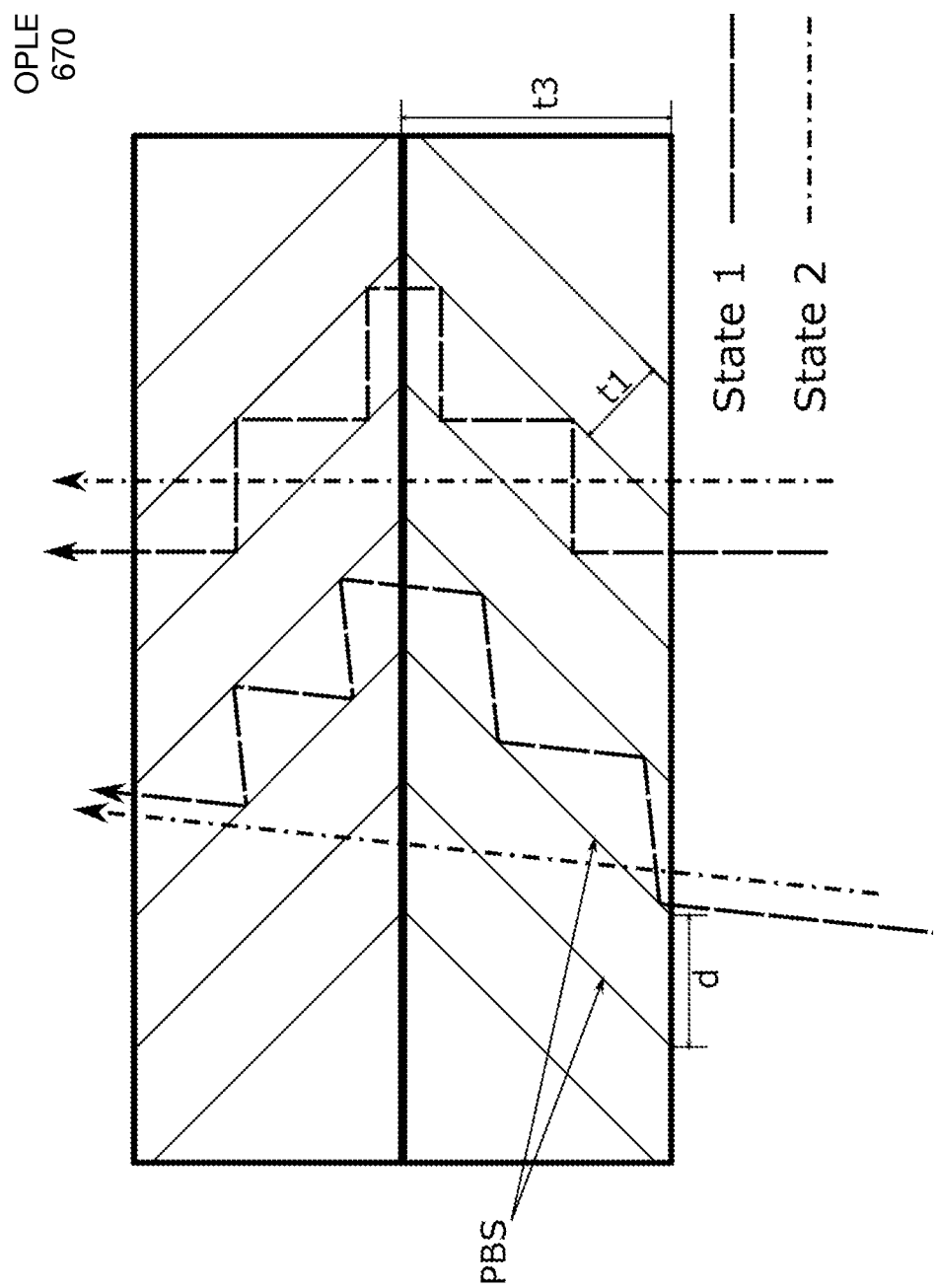
FIG. 6C illustrates another embodiment of a self-aligned OPLE.

While the self-aligned OPLEs shown in FIGS. 6A and 6B show plates of thickness t2, it should be understood that the actual thickness of a plate is not limited. FIG. 6C illustrates a self-aligned OPLE 670 in which the plates are much thicker, causing more lengthening of the light path between state 1 polarized light and state 2 polarized light. It should also be noted that the thickness of the two plates used in a self-aligned OPLE need not be matched.

Figure 6D:
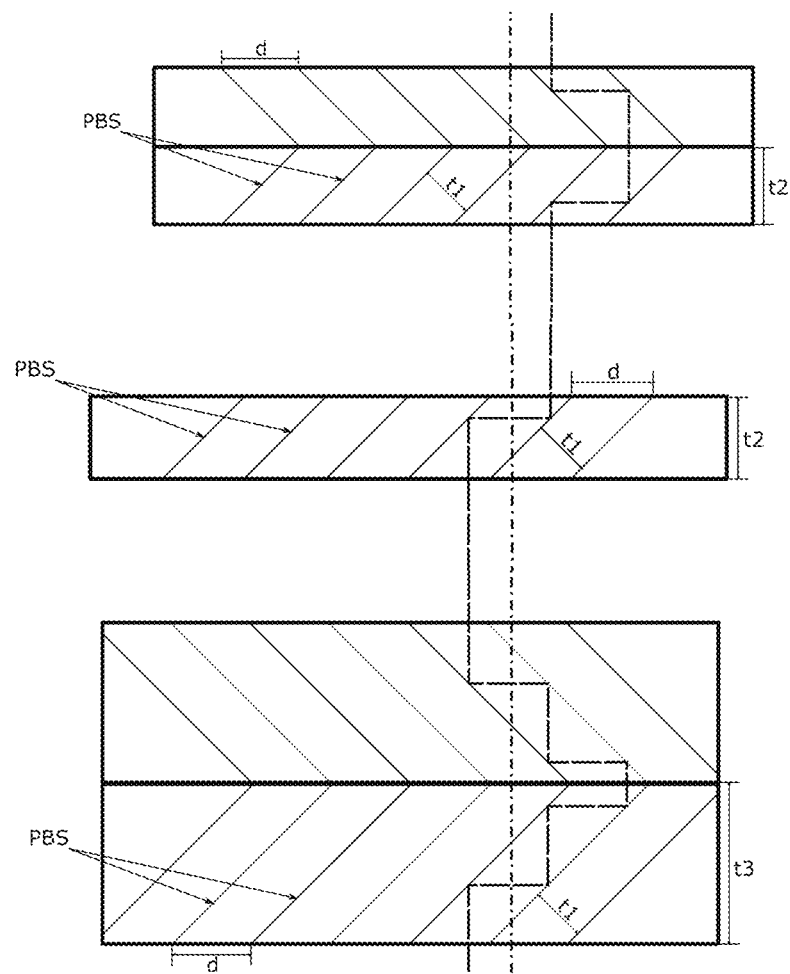
FIG. 6D illustrates one embodiment of an OPLE including a plurality of plates.

FIG. 6D illustrates one embodiment of an OPLE 680 which includes a plurality of plates. A single OPLE 680 may include one or more plates with polarization sensitive reflective elements. In the example illustrated in FIG. 6D, the OPLE 680 includes five plates. The effective thickness of OPLE 680 is the thickness of the plates making up the OPLE 680, in this case 2*t3+t2+2*t2.

Figure 7A:
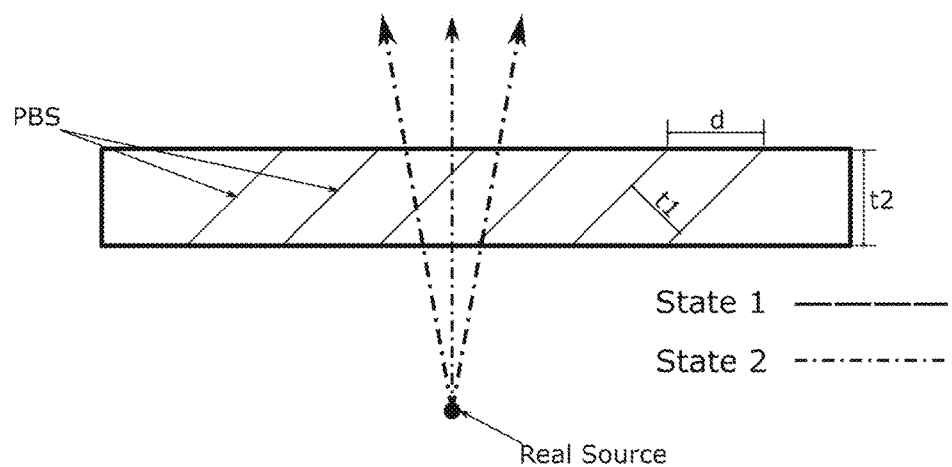
FIG. 7A illustrates one embodiment of the effect of using an OPLE with non-reflected light.

FIG. 7A illustrates one embodiment of the effect of using an OPLE, with a light source for non-reflected light. As can be seen, in this example, for state 2 polarized light which is not reflected by the polarization sensitive reflective elements, the real light source and the "virtual" or perceived light source are in the same position. This figure additionally shows that for a real light source, light travels in a cone, rather than a straight light as is usually illustrated for simplicity.

Figure 7B:
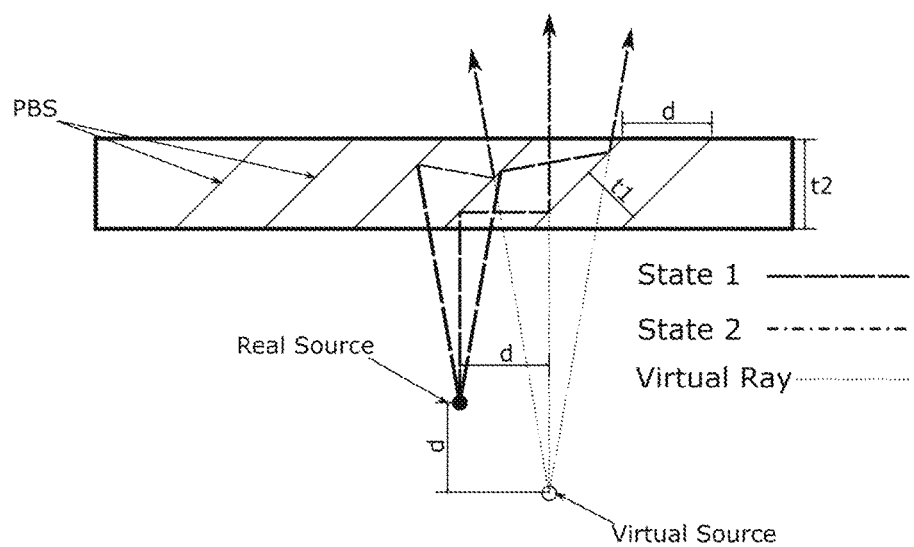
FIG. 7B illustrates one embodiment of the effect of using the OPLE of FIG. 7A, with reflected light.

FIG. 7B illustrates one embodiment of the effect of using the OPLE of FIG. 7A, with a light source for reflected light. In this illustration, state 1 polarized light is reflected. Thus, the user's perceived "virtual light source" is spatially shifted from the real light source. The lengthening of the light path shifts the virtual source vertically, while the movement of the light caused by the bounce shifts the apparent light source horizontally. In the example shown, the virtual light source is shifted to the right and back. The virtual rays show that the user's perception tracks back the light, to perceive the virtual source.

Figure 7C:
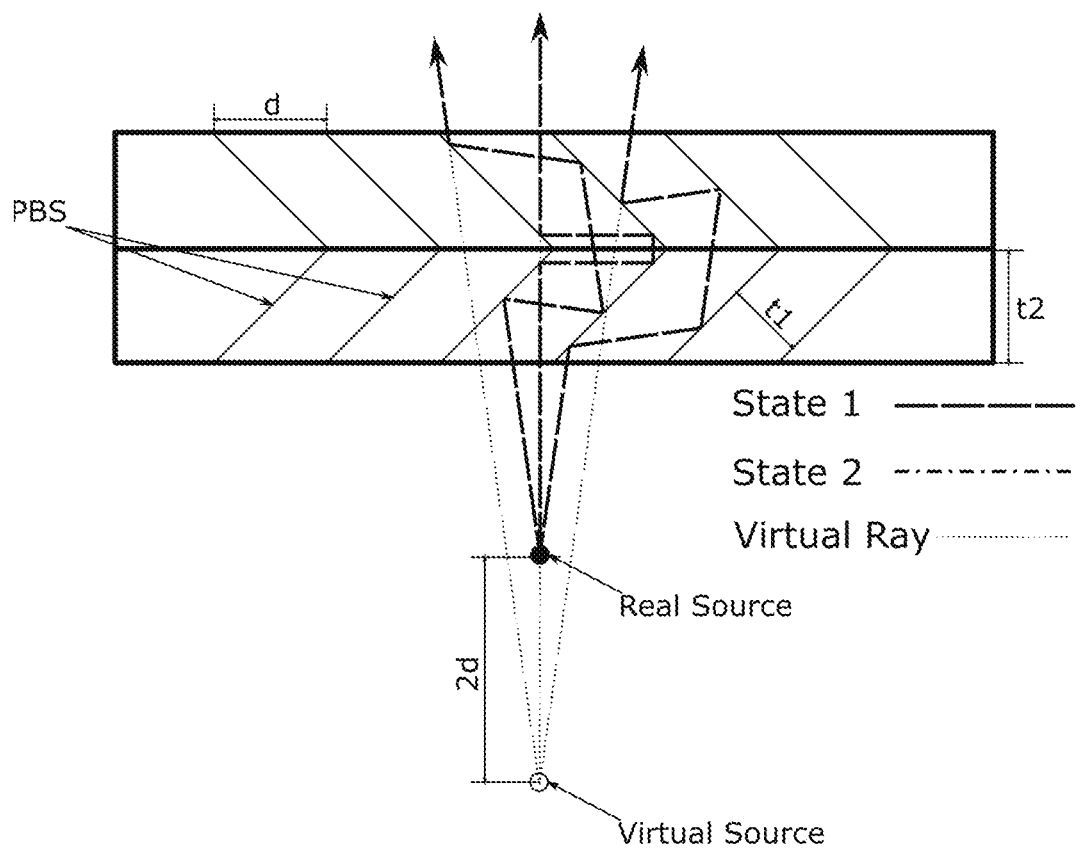
FIG. 7C illustrates one embodiment of the effect of using a self-aligned OPLE, with reflected light.

FIG. 7C illustrates one embodiment of the effect of using a self-aligned OPLE, with a light source, for reflected light. As can be seen, by using the self-aligned OPLE, the virtual light source appears to further away (e.g. lengthening the focal length) but not shifted in position. Although the self-aligned OPLE shown in FIG. 7C has no gap between the plates, as discussed above a gap, including a gap with additional optical elements could continue to provide this self-alignment feature. Furthermore, while the two plates in the shown self-aligned OPLE are matched, they need not have an identical thickness or angle for the polarization sensitive reflective elements, as discussed above.

Figure 7D:
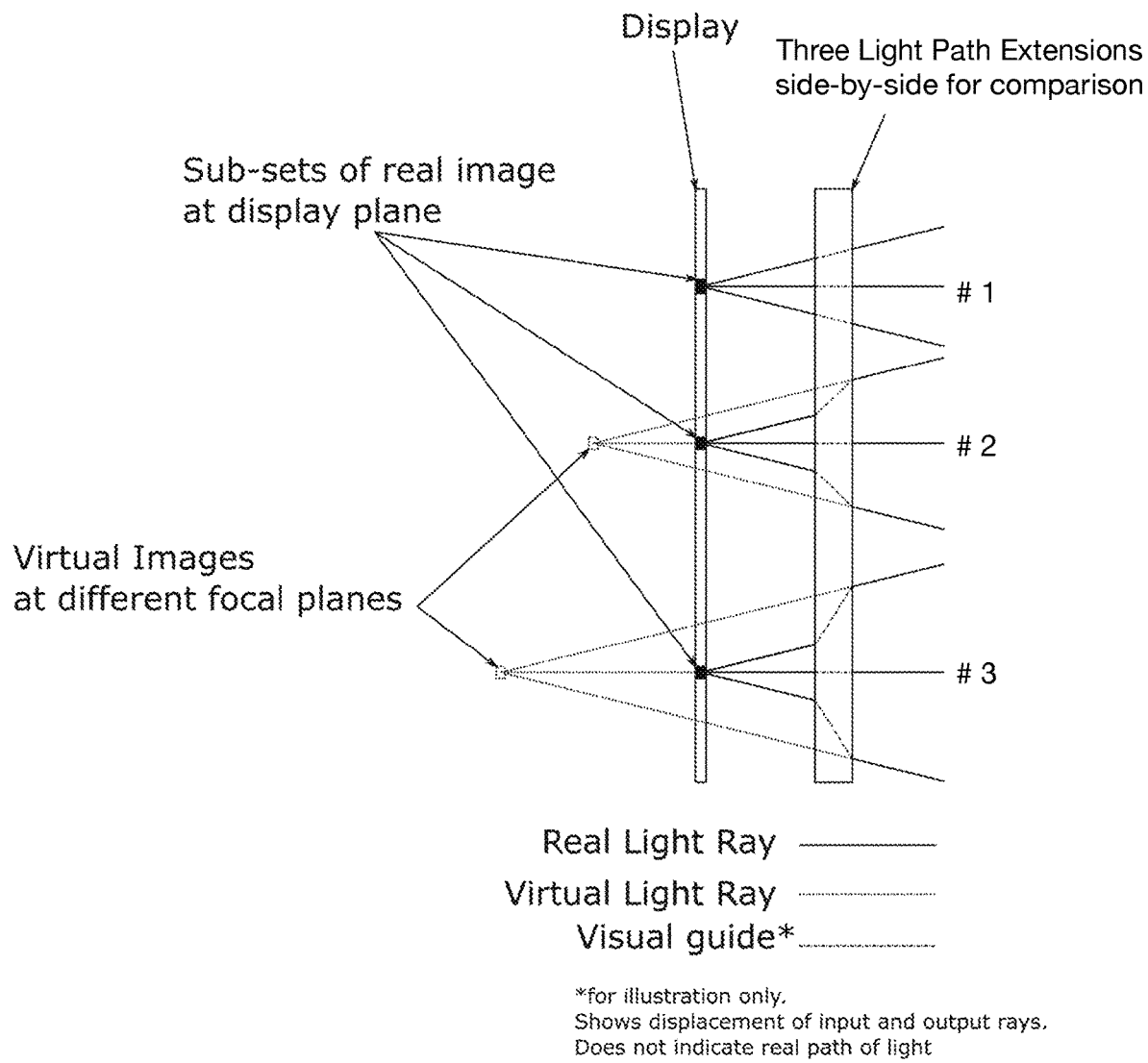
FIG. 7D illustrates an example of light path extensions and the effect on a display.

FIG. 7D shows the effect of light extension, on a perceived image. The illustration shows three degrees of light extension side by side, for comparison. The first one passes the light without any lengthening, so the image is perceived at the focal plane of the display. The second one lengthens the light path, which causes the user to perceive the image at a different focal plane. The third one lengthens the light path further, which causes the user to perceive a virtual image at a third focal plane. Thus, by controlling the length of the light extension, a system can create virtual images and image elements at various focal points. Using the digital light path length modulator, the system can adjust the light path digitally, and selectively position virtual images at various focal lengths.

Figure 7E:
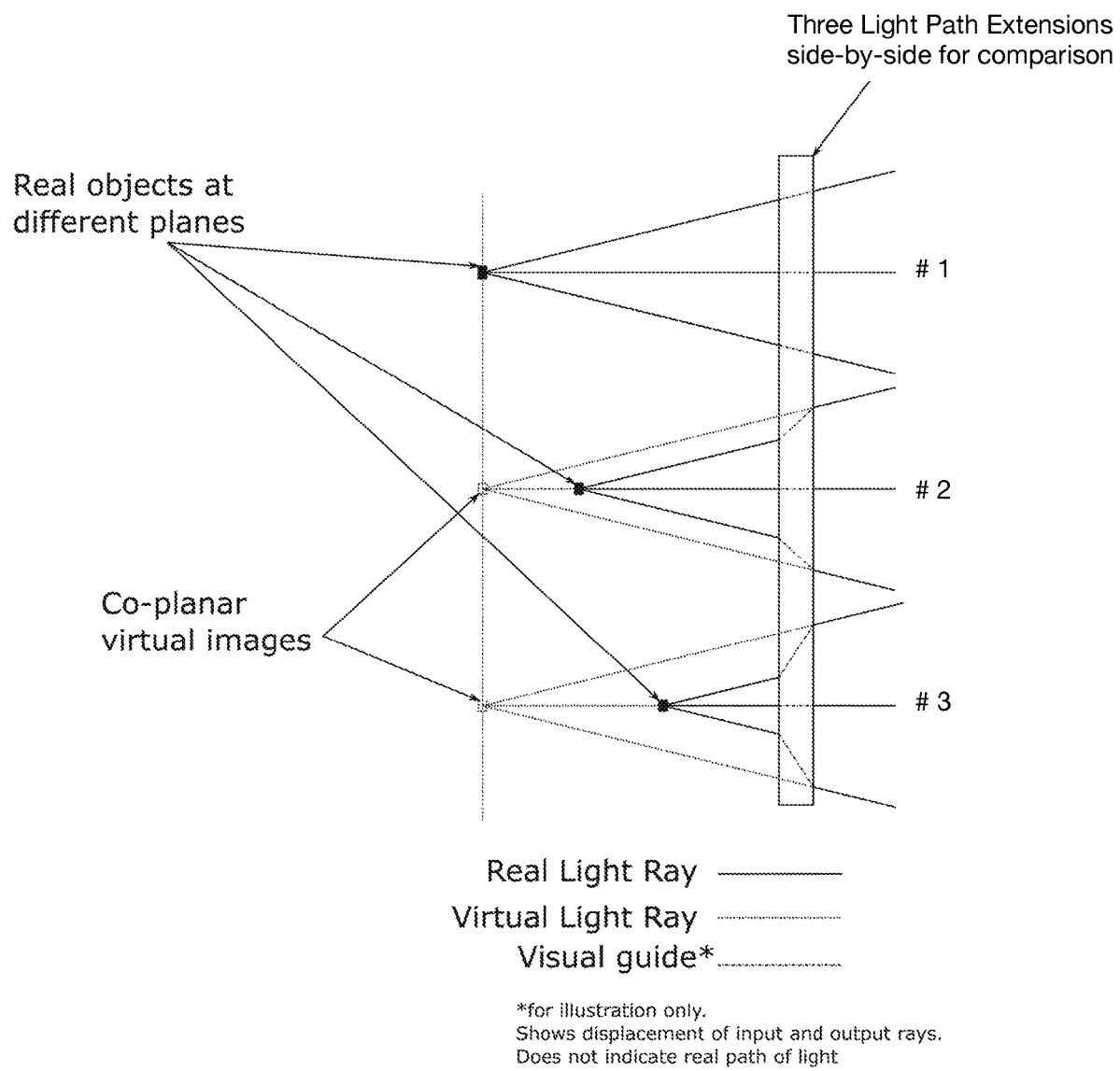
FIG. 7E illustrates an example of light path extensions and the effect on image capture.

FIG. 7E shows the effect of light extension on capturing image data, at different real planes. Because of the light extension, the virtual images appear co-planar, even when the real objects are at different planes.

Figure 8A:
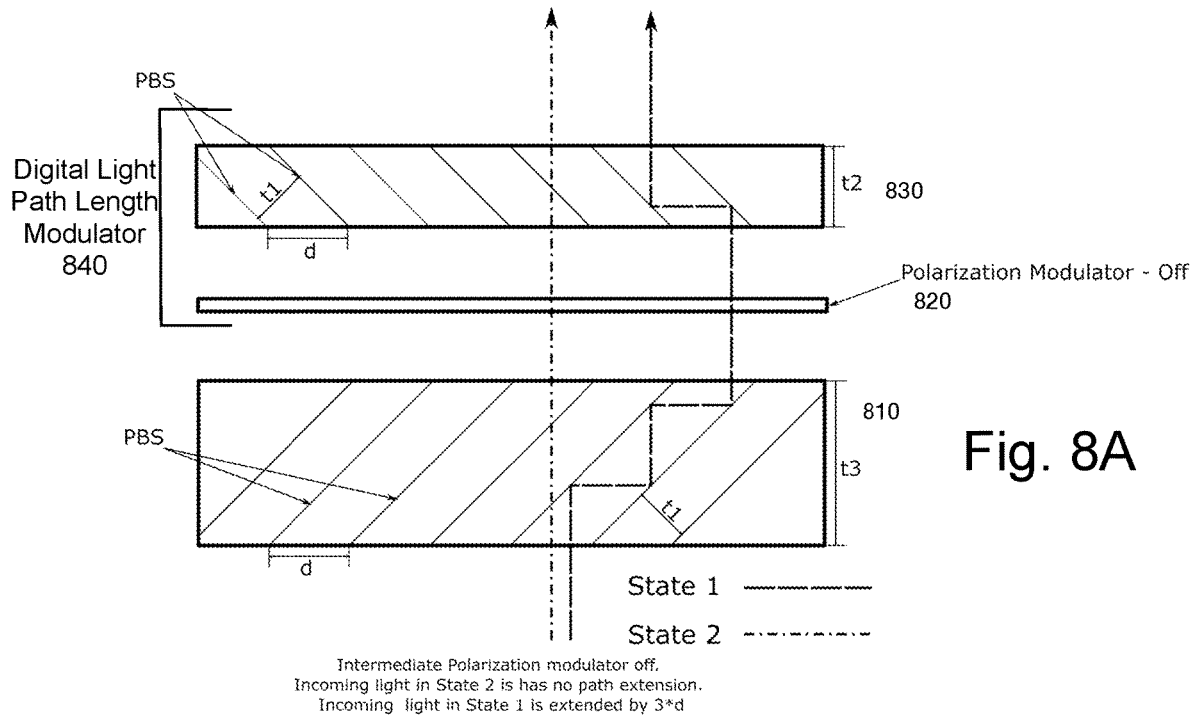
FIGS. 8A and 8B illustrate one embodiment of a digital light path length modulator and an OPLE, showing different light path lengths.
Figure 8B:
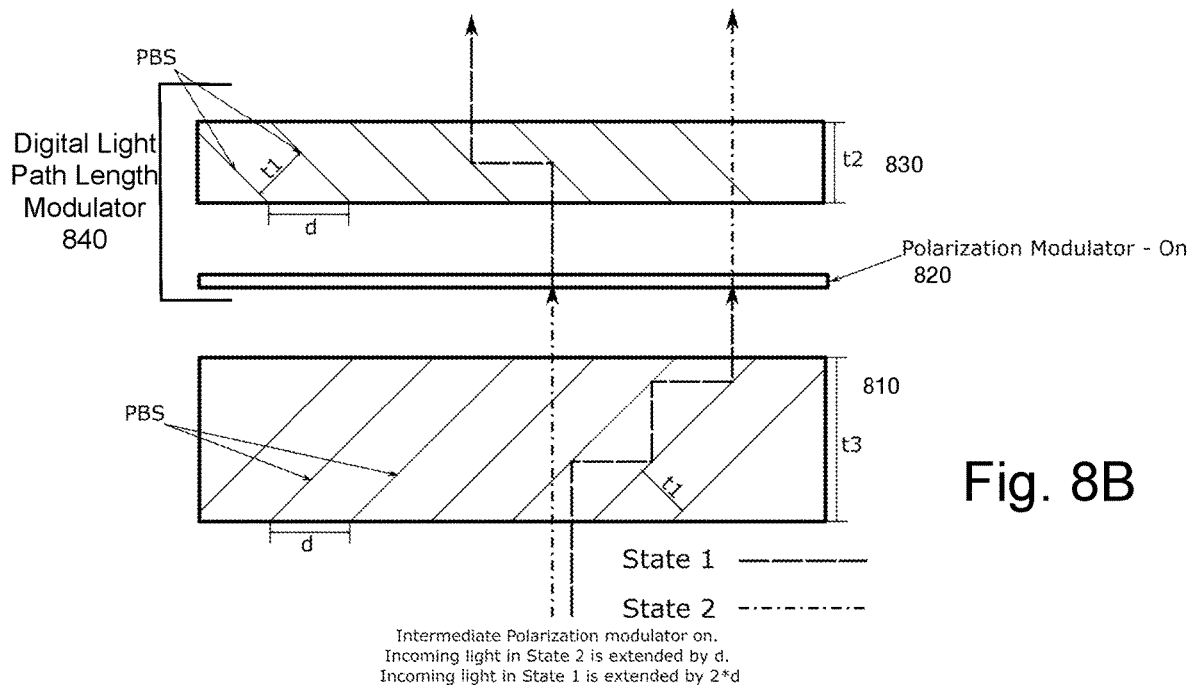

FIGS. 8A-8D illustrate embodiments of an OPLE combined with a digital light path length modulator, showing some examples of the various light path lengths which may be created. FIGS. 8A and 8B show a digital light path length modulator 840 and an OPLE 810.

In the example shown in FIG. 8A, the polarization modulator 820 is "off," and thus the state 2 polarized light goes straight through both OPLEs 810, 830, while the state 1 polarized light is reflected in both OPLEs 810, 830. Thus, in this example, the light that is state 2 polarized entering the system is not extended at all, while the light that is state 1 polarized when it enters the system is extended, in this example by 3*d.

In contrast, in FIG. 8B the polarization modulator 820 is "on," reversing polarization between the two OPLEs 810, 830. Therefore, the state 2 polarized light passes through the first OPLE 810, then is changed to state 1 polarized light, and is reflected in the second OPLE 830. The originally state 1 polarized light is reflected in the first OPLE 810, is changed to state 2 polarized light, and is passed through the second OPLE 830.

When the angle of the polarization sensitive reflective elements is at 45 degrees, as shown in FIGS. 8A and 8B, the length of the incoming state 2 polarized light is extended by d in the second OPLE 830, while the length of the incoming state 1 polarized light is extended by 2d, in the first OPLE 810. Thus, by utilizing a set of digital light path length modulators, a number of different light path lengths may be created.

Figure 8C:
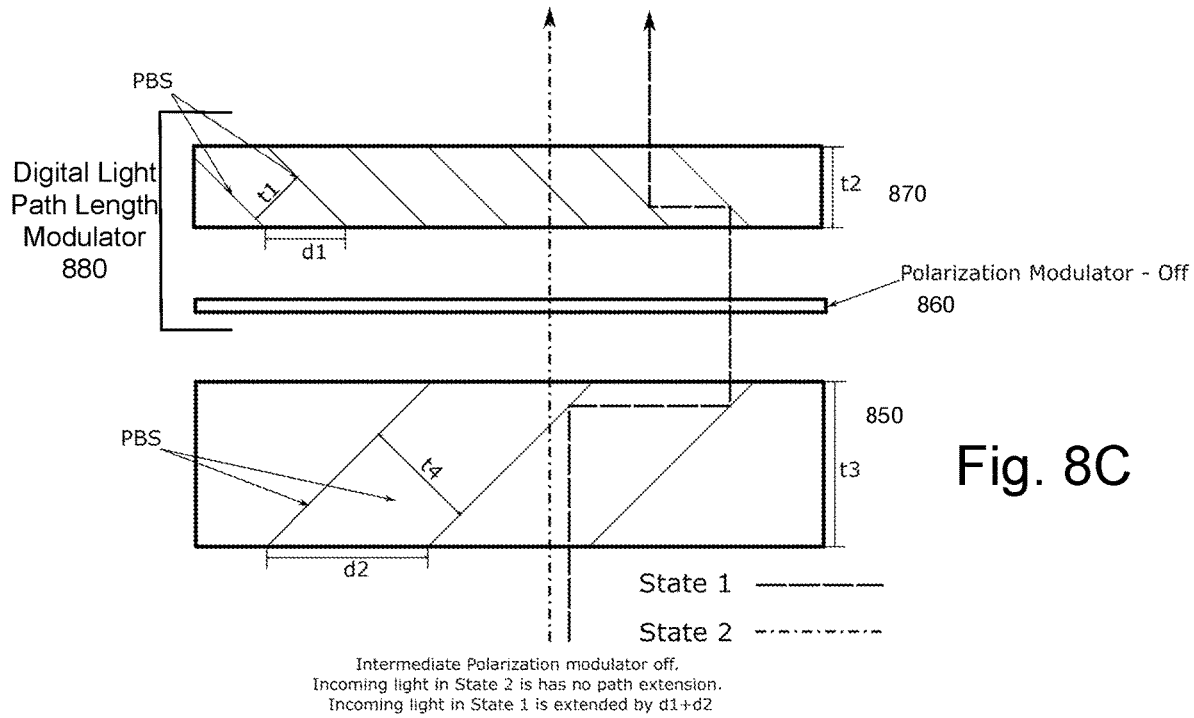
FIGS. 8C and 8D illustrate one embodiment of a digital light path length modulator and an OPLE, showing various light path lengths.
Figure 8D:
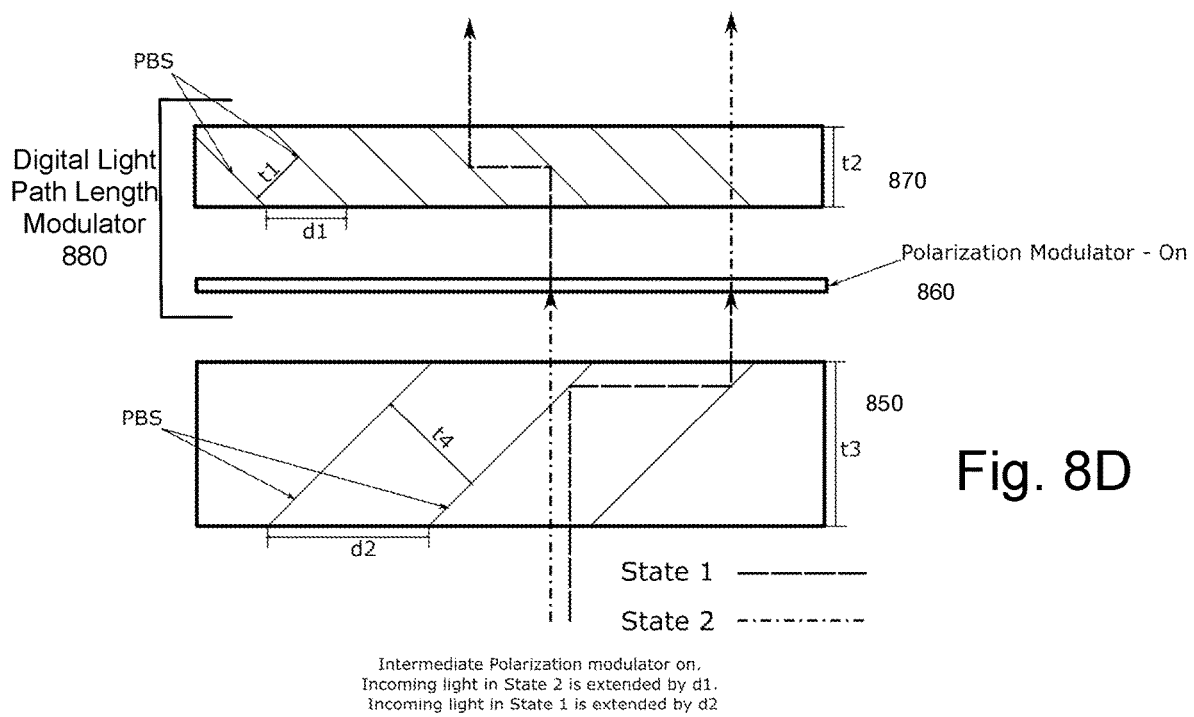

FIGS. 8C and 8D show another digital light path length modulator combined with an OPLE. In this example, the distance between the polarization sensitive reflective elements in the first OPLE 850 is different from the distance between the polarization sensitive reflective elements in the second OPLE 870. Thus, the extension of the beams is based on an addition of d1 (the distance between the polarization sensitive reflective elements of the first OPLE 850) and d2 (the distance between the polarization sensitive reflective elements of the second OPLE 870). Note that the reason the extension is by d+d2 is because the angle of the polarization sensitive reflective elements for both OPLEs 850, 870 is 45 degrees. If the angle is altered, the length of the light path extension may also be altered.

In this way, by tuning the light with the polarization modulator, and optionally varying the thickness of the OPLEs in a series of digital light path length modulators, the system can adjust the light path extension in discrete steps. That is, by adjusting the polarization of a light beam, while it passes through a plurality of OPLEs, the total path length of the light can be adjusted incrementally between a shortest length (where the light passes through all OPLEs without reflection) and a longest length (where the light is reflected by all of the OPLEs.)

In one embodiment, for OPLEs having different light path lengths—caused by one or more of different thickness, spacing or angle of the polarization sensitive reflective elements—N OPLEs produce 2^N light path lengths. For identical OPLEs, N OPLEs produce N+1 light path lengths. In one embodiment, they may produce more light path lengths than N+1, or 2^N. In one embodiment, the thickness of an OPLE may range from 250 microns to 3 mm, though it may be larger or smaller.

Figure 9A:
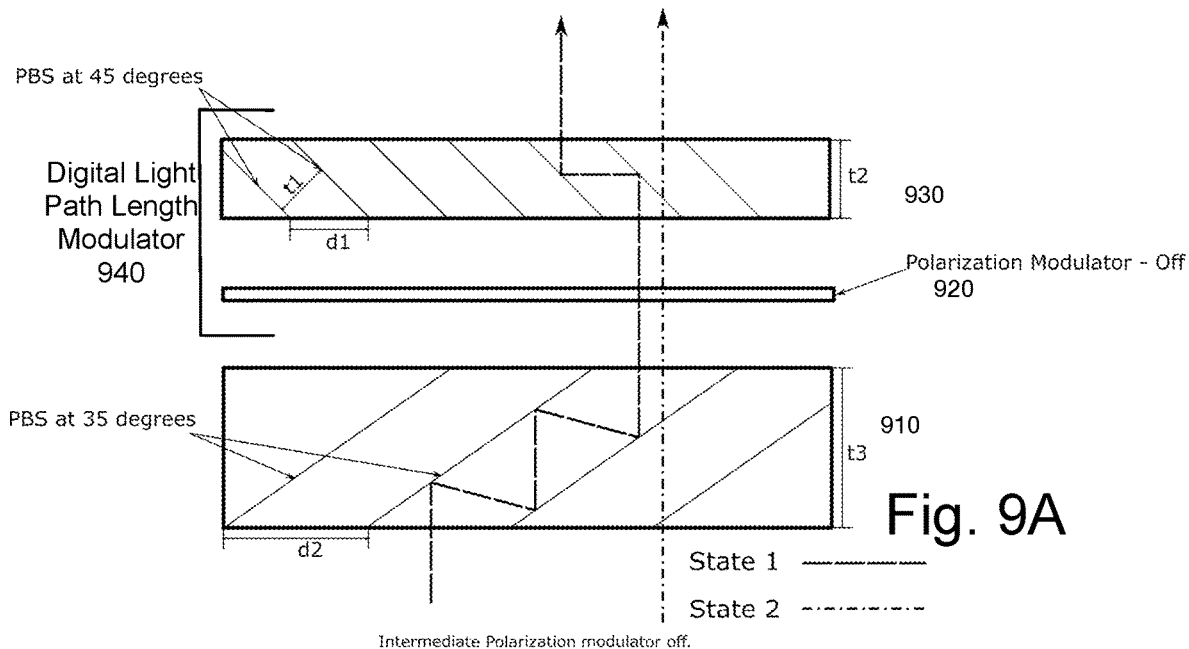
FIGS. 9A and 9B illustrate one embodiment of a digital light path length modulator and an OPLE, showing various light path lengths.
Figure 9B:
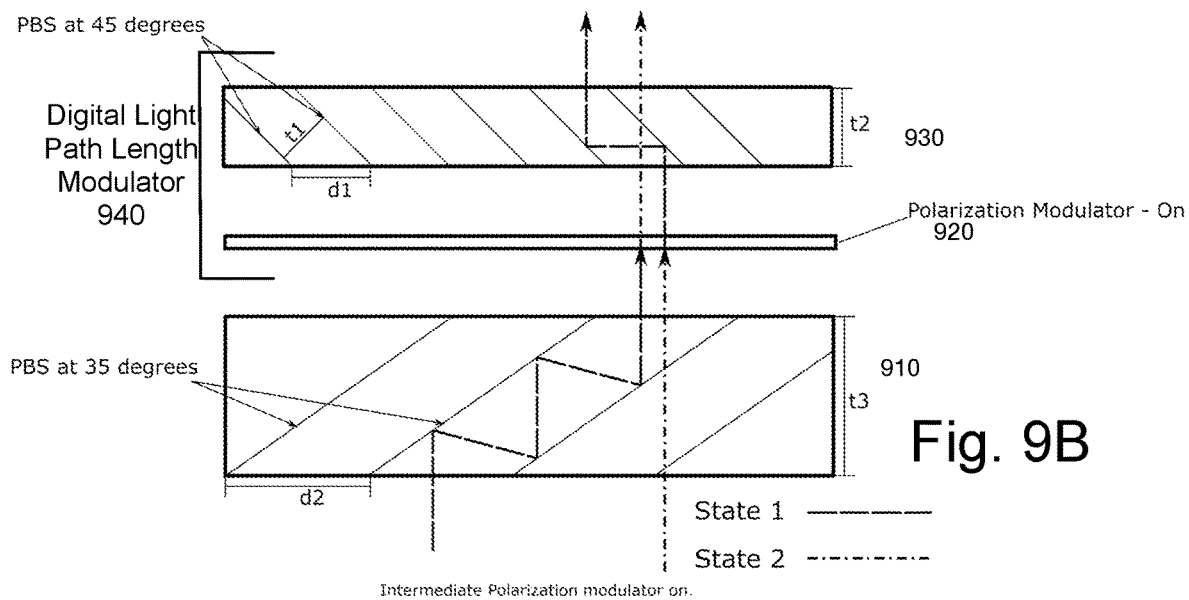

FIGS. 9A and 9B illustrate one embodiment an OPLE combined with a digital light path length modulator. In this example, the OPLE 930 in the digital light path length modulator 940 has the polarization sensitive reflective elements at a different angle than the other OPLE 910. As can be seen, the light path length adjustment in such an instance would be larger.

Figure 10:
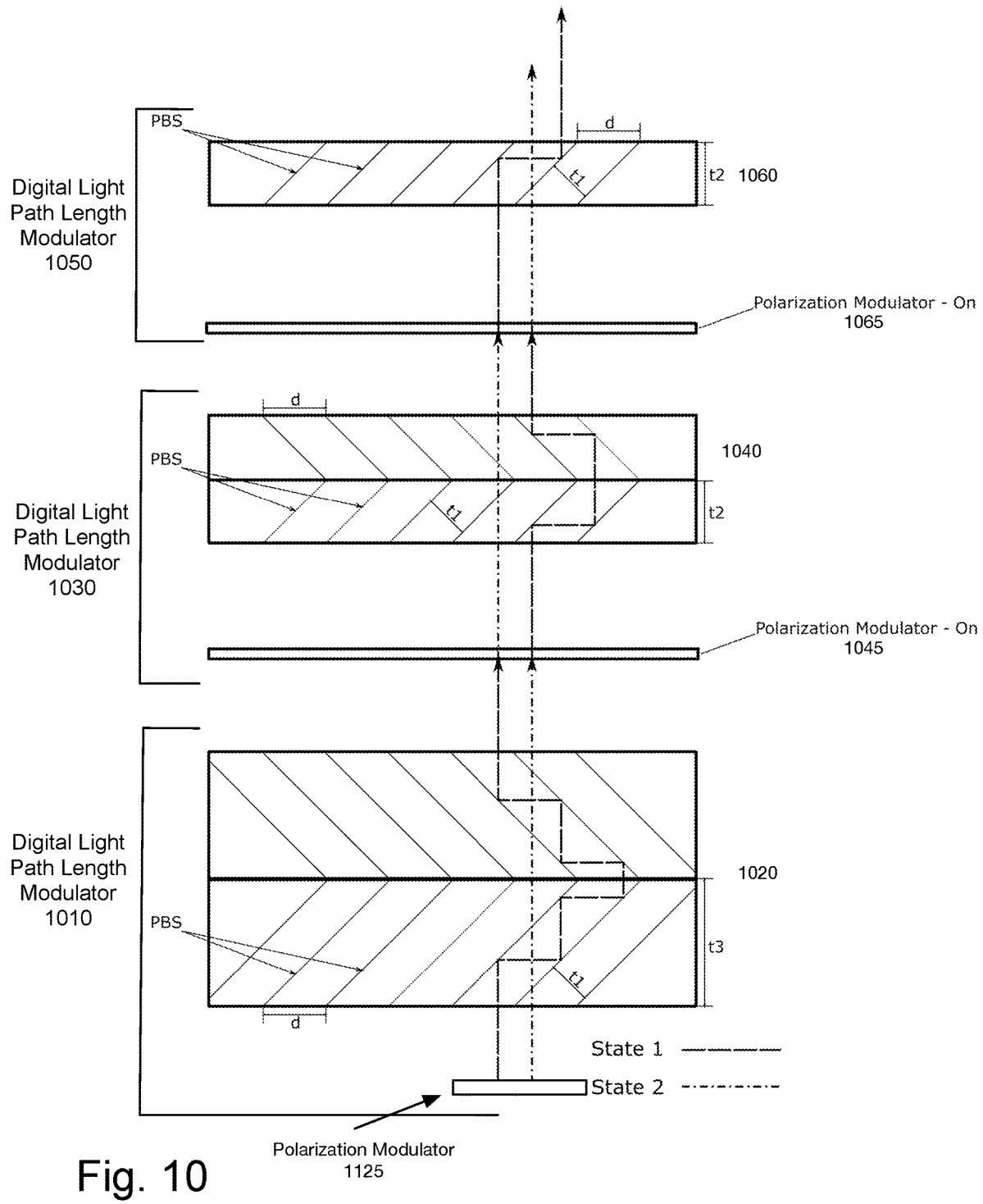
FIG. 10 illustrates one embodiment of a modulation stack including three digital light path length modulators.

FIG. 10 illustrates one embodiment of a modulation stack including three digital light path length modulators. Each of the digital light path length modulators 1010, 1030, 1050 includes a polarization modulator and an OPLE. In this example, two of the OPLEs 1020, 1040 are self-aligned OPLEs.

In various embodiments, one or more of the following variations may be made: the effective thickness of the OPLEs may vary, as may the angles of the polarization sensitive reflective elements, and the OPLE may include one, two, or more plates. The effective thickness of the OPLE is defined as the cumulative thickness of the plates which are parts of the OPLE. Thus the effective thickness of OPLE 1040 is different than the thickness of OPLE 1060, even though the individual plates in the two OPLEs 1040, 1060 are identical.

With the shown set of three different OPLEs, the system can create up to eight, $2^3$ focal lengths by selectively modulating the polarization, as follows:

| OPLE 1 | OPLE 2 | OPLE 3 |
| --- | --- | --- |
| State 1 | State 1 | State 1 |
| State 1 | State 1 | State 2 |
| State 1 | State 2 | State 1 |
| State 1 | State 2 | State 2 |
| State 2 | State 1 | State 1 |
| State 2 | State 1 | State 2 |
| State 2 | State 2 | State 1 |
| State 2 | State 2 | State 2 |

Figure 11:
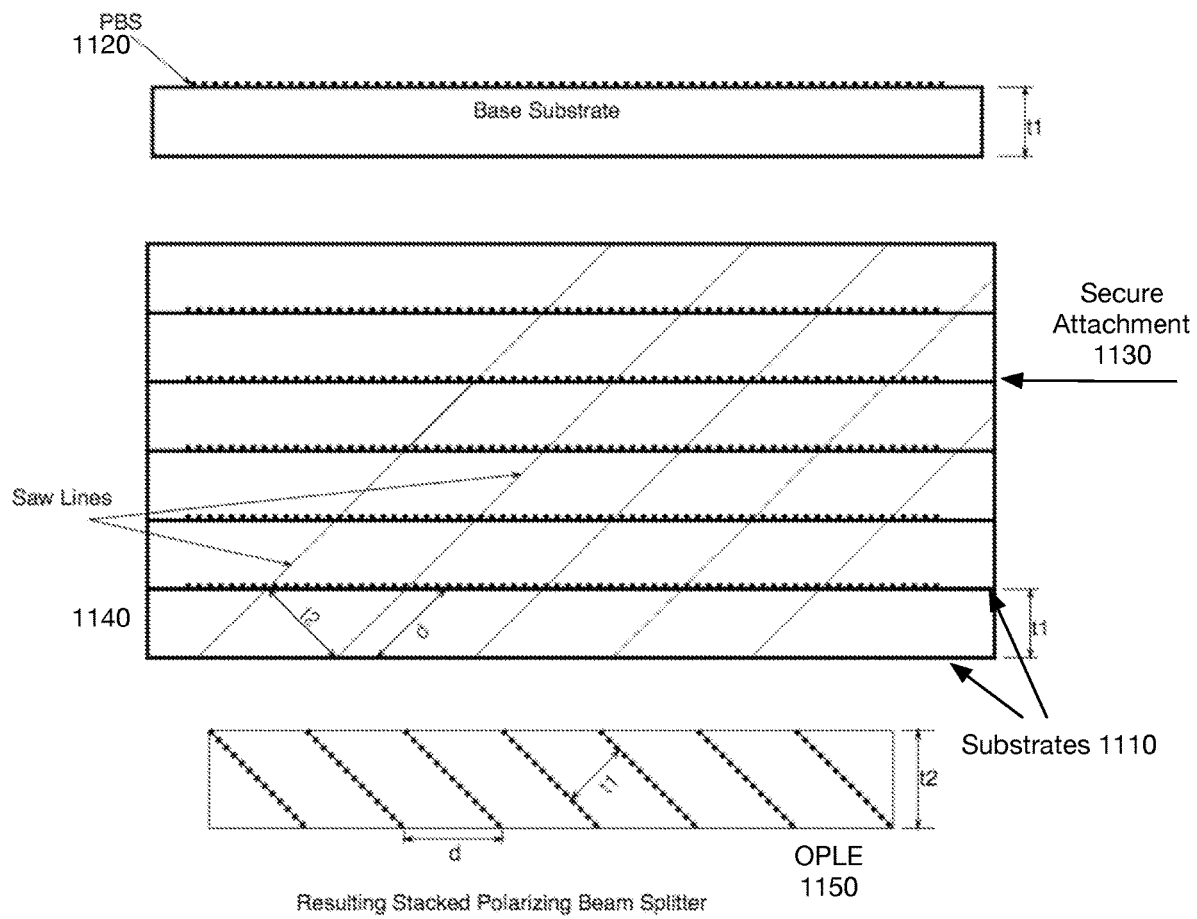
FIG. 11 illustrates one embodiment of manufacturing a set of plates to be used as OPLEs.

FIG. 11 illustrates one embodiment of manufacturing plates to be used as OPLEs. One of the advantages of the present system is the ability to easily and affordably manufacture consistent OPLEs. Note that the manufacturing creates plates, one or more of which form an OPLE. As discussed above, an OPLE may include one or more such plates.

The OPLEs, in one embodiment, are made with a plurality of base substrates 1110 stacked. The substrates 1110 are made of material that is optically transparent to the wavelengths being modulated. In one embodiment, the substrate 1110 is made of glass. Alternatively, another material that is optically clear to the wavelengths used, such as plastic, transparent ceramic, silicon, sapphire, or other materials may be used. In one embodiment, each substrate 1110 is between 250 microns and 3 mm thick. The thickness of the substrate defines the spacing of the polarization sensitive reflective elements in the final OPLEs.

Deposited on each substrate 1110 is a polarization sensitive reflective element 1120, also referred to as a polarized beam splitter (PBS). In one embodiment, the polarization sensitive reflective element 1120 is a dielectric film. The dielectric film may be deposited in various ways. In one embodiment, the dielectric film comprises oxide/nitride stacks which are spun, vapor deposited, or annealed, or evaporated onto the substrate. The polarization sensitive reflective element in another embodiment is a wire grid, nanoscale wire lines forming a closely spaced grid. In one embodiment, the sizing of the wire grid is wires that are 100 nm wide, with a 200 nm pitch. The spacing of the grid lines is smaller than the wavelength of the light.

The substrates 1110 with the polarization sensitive reflective elements 1120 are then attached to each other. The attachment may use adhesion, fusing, or other methods of securing together the substrates 1110, in one embodiment. In one embodiment, the adhesive used is optically clear glue. In one embodiment, the substrates 1110 may be attached via a scaffolding, in which the substrates 1110 are spaced apart using a support structure, rather than adhered or otherwise directly attached. Other methods of securing substrates together may be used. At a minimum, three substrates 1110 with polarization sensitive reflective elements 1120 are stacked to form an OPLE, while at a maximum the number of substrates 1110 may be in the hundreds.

Figure 12:
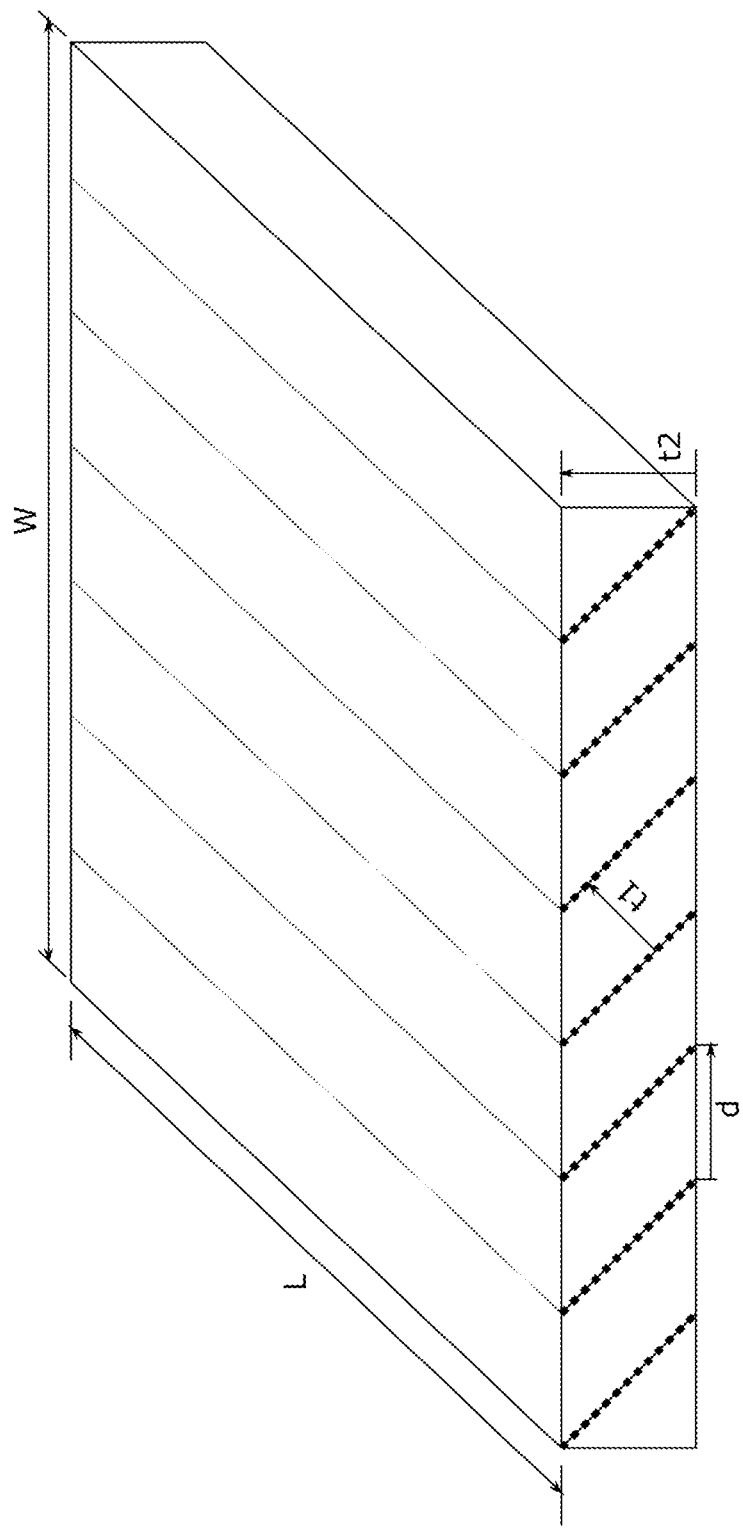
FIG. 12 illustrates a perspective view of one embodiment of an OPLE.

Once the adhesive or other attachment mechanism 1130 is fully secured, the OPLEs are cut apart, at saw lines 1140. The angle of the saw lines 1140 is between 20 and 70 degrees, and defines the angle of the polarization sensitive reflective elements 1120 in the OPLE 1150. In a preferred embodiment, the saw lines are at a 45 degree angle. In one embodiment, the thickness of the OPLEs is between 250 microns and 3 mm. FIG. 12 illustrates a perspective view of an OPLE, having a length and width, and a thickness t2.

Returning to FIG. 11, the process shown produces consistent OPLEs 1150 with polarization sensitive reflective elements 1120 at an angle between 20 to 70 degrees. These plates may be used for an OPLE which provides a staircase effect for lengthening the light path, which may be controlled by digitally modulating the polarization of the light impacting the OPLE. The OPLE and the digital light path length modulator is easily and consistently manufactured, and takes up very little space.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A system to adjust light path length comprising a digital light path length modulator, the digital light path length modulator comprising:
   a polarization modulator to receive polarized light and to modulate a polarization of some or all of the polarized light; and
   an optical path length extender (OPLE) comprising a plate having three or more parallel polarization sensitive reflective elements to direct the light having a first polarization through a first light path through the OPLE, and to direct the light having a second polarization through a second light path through the OPLE, the first and second light paths having different light path lengths.

2. The system of claim 1, wherein each of the polarization sensitive reflective elements are parallel to each other, and at an angle between 20 degrees and 70 degrees to a path of the light entering the OPLE.

3. The system of claim 1, wherein the polarization sensitive reflective elements are selected from among a dielectric layer or a wire grid.

4. The system of claim 1, further comprising:
   a self-aligned OPLE comprising two matched plates, each plate having a plurality of parallel polarization sensitive reflective elements, the two matched plates producing equal and opposite spatial shifts, an output of the self-aligned OPLE having no spatial shift of the light with the first polarization and the light with the second polarization.

5. The system of claim 4, wherein the two plates in the self-aligned OPLE have mirrored polarization sensitive reflective elements.

6. The system of claim 1, further comprising:
   a second digital light path length modulator, the second digital light path length modulator comprising:
      a second polarization modulator, to receive the polarized light exiting from the OPLE, and to modulate the polarization of some or all of the polarized light; and
      a second OPLE to further alter relative light path lengths;
   thereby creating a plurality of digitally selectable path lengths.

7. The system of claim 1, further comprising:
   a polarizer to generate the polarized light.

8. The system of claim 1, further comprising:
   a modulation stack comprising a plurality of digital light path length modulators to enable a plurality of digitally selectable path lengths.

9. A system comprising:
   an optical path length extender (OPLE) including a plurality of parallel polarization sensitive reflective elements, the OPLE comprising two light paths having different path lengths, such that light having a first polarization is directed through a first light path, and the light having a second polarization is directed through a second light path.

10. The system of claim 9, wherein for polarized light incident on the OPLE, a first subset of light travels through the first light path, and a second subset of light travels through the second light path.

11. A system comprising:
   a light source;
   a modulation stack comprising:
      a first digital light path length modulator comprising:
         a first polarization modulator to modulate a polarization of a first set of light from the light source;
         a first optical path length extender (OPLE) including parallel polarization sensitive reflective elements, the OPLE to direct light having a first polarization through a first light path, and the light having a second polarization through a second light path through the OPLE, the first and second light paths having different light path lengths;
      a second digital light path length modulator comprising:
         a second polarization modulator to modulate the polarization of the light exiting from the first OPLE;
         a second OPLE including a plurality of parallel polarization sensitive reflective elements, the second OPLE having a third light path and a fourth light path, the second OPLE to direct the light having a first polarization through the third light path, and the light having a second polarization through the fourth light path through the OPLE, the third and the fourth light paths having different light path lengths; and an output of the modulation stack having a plurality of path lengths corresponding to a number of the digital light path length modulators in the modulation stack.

12. The system of claim 9, wherein the polarization sensitive reflective elements are parallel to each other and at an angle of between 20 degrees and 70 degrees to a path of the light entering the OPLE.

13. The system of claim 9, wherein the polarization sensitive reflective elements are selected from among a dielectric layer or a wire grid.

14. The system of claim 9, wherein:
a self-aligned OPLE comprising two matched plates producing equal and opposite spatial shifts.

15. The system of claim 14, wherein light exiting the self-aligned OPLE is not spatially shifted from a path of the light entering the self-aligned OPLE.

16. The system of claim 14, wherein angles of the polarization sensitive reflective elements in the two plates in the self-aligned OPLE are mirrored.

17. The system of claim 9, further comprising:
a polarization modulator to modulate a polarization of some or all of the polarized light exiting from the OPLE;
a second OPLE receiving light output by the polarization modulator, the second OPLE to further alter light path lengths; and
the polarization modulator and the second OPLE comprising a digital light path length modulator.

18. The system of claim 9, further comprising:
a polarizer to generate the polarized light;
a polarization modulator to modulate a polarization of some or all of the polarized light before entering the OPLE; and
the polarization modulator and the OPLE comprising a digital light path length modulator.

19. The system of claim 18, further comprising:
a plurality of digital light path length modulators forming a modulation stack, the modulation stack used to generate a plurality of digitally selectable light path lengths.

20. The system of claim 9, further comprising:
a digital correction system to adjust the light from a light source to correct spatial shift between the light exiting the first light path, and the light exiting the second light path.

21. The system of claim 10, further comprising:
a digital correction system to adjust the light from a light source to correct spatial shift between the light exiting the first light path, and the light exiting the second light path.

22. The system of claim 21, wherein the first OPLE comprises two plates, and further the two plates have a same thickness and mirror image angles for the parallel polarization sensitive reflective elements.

* * * * *